(12) United States Patent
Nathella et al.

(10) Patent No.: US 11,797,307 B2
(45) Date of Patent: Oct. 24, 2023

(54) RANGE PREFETCH INSTRUCTION

(71) Applicant: Arm Limited, Cambridge (GB)

(72) Inventors: Krishnendra Nathella, Austin, TX (US); David Hennah Mansell, Norwich (GB); Alejandro Rico Carro, Austin, TX (US); Andrew Mundy, Hethersett (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/355,641

(22) Filed: Jun. 23, 2021

(65) Prior Publication Data

US 2022/0413866 A1 Dec. 29, 2022

(51) Int. Cl.
*G06F 9/30* (2018.01)
*G06F 9/38* (2018.01)
*G06F 12/12* (2016.01)

(52) U.S. Cl.
CPC ........ *G06F 9/3802* (2013.01); *G06F 9/30047* (2013.01); *G06F 9/3818* (2013.01); *G06F 12/12* (2013.01); *G06F 2212/1044* (2013.01); *G06F 2212/6028* (2013.01)

(58) Field of Classification Search
CPC .. G06F 9/3802; G06F 9/30047; G06F 9/3818; G06F 12/12; G06F 2212/1044; G06F 2212/6028
See application file for complete search history.

(56) References Cited

U.S. PATENT DOCUMENTS

| 6,202,130 | B1 | 3/2001 | Scales, III et al. |
| 7,533,242 | B1 | 5/2009 | Moll et al. |
| 2004/0268051 | A1* | 12/2004 | Berg ....................... G06F 9/342 712/E9.047 |
| 2006/0248281 | A1 | 11/2006 | Al-Sukhni et al. |
| 2007/0088915 | A1 | 4/2007 | Archambault et al. |
| 2009/0199190 | A1 | 8/2009 | Chen et al. |
| 2011/0035551 | A1* | 2/2011 | Hooker ............... G06F 12/0862 711/E12.017 |

(Continued)

OTHER PUBLICATIONS

Struik et al. "Combined Hardware/Software Solution for Stream Prefetching in Multimedia Applications", Multimedia Hardware Architectures 1998, vol. 3311, International Society for Optics and Photonics, 1998, 11 pages.

(Continued)

*Primary Examiner* — Corey S Faherty
(74) *Attorney, Agent, or Firm* — NIXON & VANDERHYE P.C.

(57) ABSTRACT

In response to an instruction decoder decoding a range prefetch instruction specifying first and second address-range-specifying parameters and a stride parameter, prefetch circuitry controls, depending on the first and second address-range-specifying parameters and the stride parameter, prefetching of data from a plurality of specified ranges of addresses into the at least one cache. A start address and size of each specified range is dependent on the first and second address-range-specifying parameters. The stride parameter specifies an offset between start addresses of successive specified ranges. Use of the range prefetch instruction helps to improve programmability and improve the balance between prefetch coverage and circuit area of the prefetch circuitry.

19 Claims, 11 Drawing Sheets

(56) References Cited

U.S. PATENT DOCUMENTS

2016/0055089 A1* 2/2016 Kim .................... G06F 12/0862
711/137
2016/0188337 A1* 6/2016 Lee .................... G06F 12/0862
712/207

OTHER PUBLICATIONS

Garcia et al. "Adaptive runtime-assisted block prefetching on chip-multiprocessors", International Journal of Parallel Programming 45.3 (2017), pp. 530-550.
International Search Report and Written Opinion of the International Searching Authority for PCT/GB2022/051246 dated Aug. 29, 2022, 18 pages.

* cited by examiner

```
// Prime Prefetches
for(i=0; i<min(N, ADV); i++){
      PF(buf1[i]);
      PF(buf2[i*2]);
      PF(buf2[i*2+1]);
}

// Loop -Adding SWPF is hard
for(i=0; i<N-ADV; i++){
      process(buf1[i], buf2[i*2]);
      process(buf1[i], buf2[i*2+1]);
      PF(buf1[i+ADV]);
      PF(buf2[(i+ADV)*2]);
      PF(buf2[(i+ADV)*2+1]);
}

// Tail loop (no Prefetches)
for(i=max(N-ADV, 0); i<N; i++){
      process(buf1[i], buf2[i*2]);
      process(buf1[i], buf2[i*2+1]);
}
```

FIG. 4

```
// RangePF is more usable
range_PF(buf1, N*sizeof(T1));
range_PF(buf2, 2*N*sizeof(T2));

// Loop
for(i=0; i<N; i++) {
      process(buf1[i], buf2[i*2]);
      process(buf1[i], buf2[i*2+1]);
}
```

FIG. 5

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| other encoding bits | | | | | | | Rm | | | | | | | | | other encoding bits | | | | | | Rn | | | | | | Rt | | | |
| 11 | | | | | | | 0 | | | | | Ops, Count, Stride, Length | | | | 10 | | | | | | Base Addr | | | | | | PRFOP | | | |

50     54

Xm Register Encoding

| 63 | 60 | 59 | | 38 | 37 | | 22 | 21 | | 0 |
|---|---|---|---|---|---|---|---|---|---|---|
| 4 bits | | 22 bits | | | 16 bits | | | 22 bits | | |
| Reserved | | Stride (+/- 2MB) | | | Count (64K) | | | Length (+/- 2MB) | | |
| | | Units: Bytes | | | | | | Units: Bytes | | |

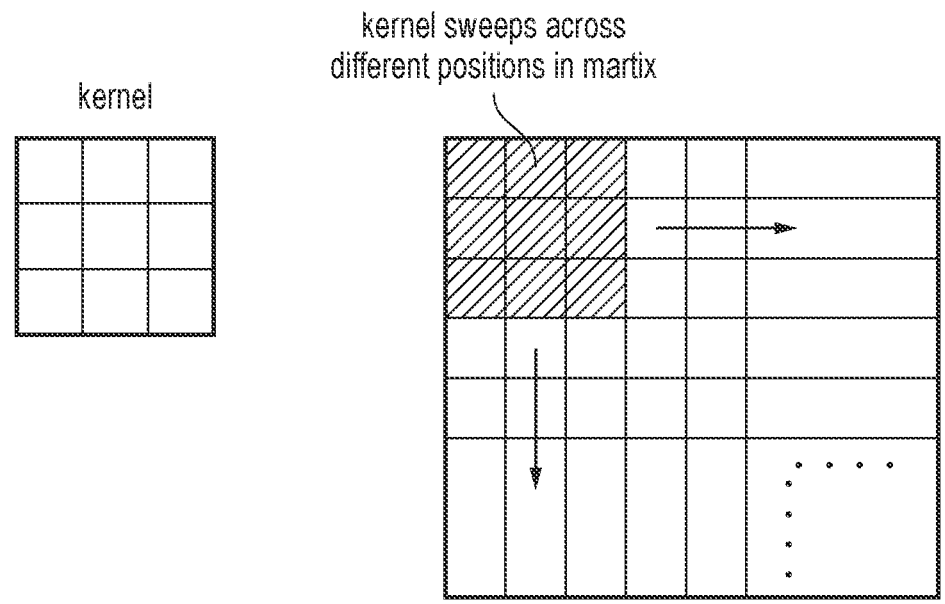
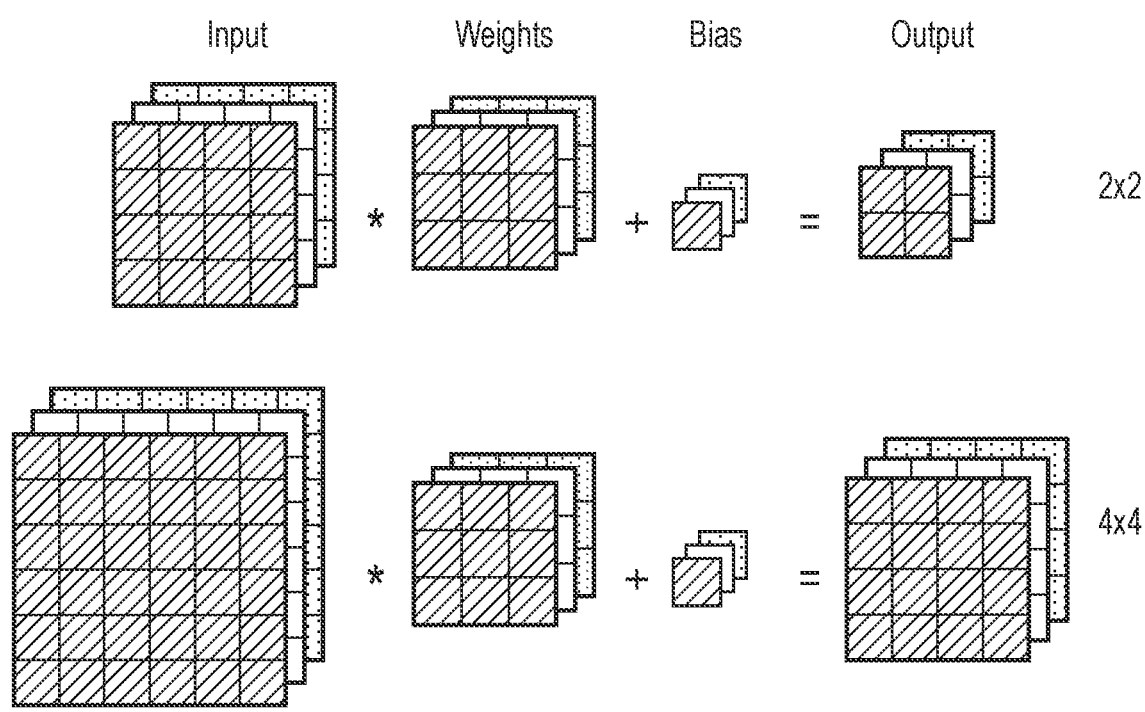
FIG. 8

RANGE PREFETCH INSTRUCTION

BACKGROUND

Technical Field

The present technique relates to the field of data processing. More particularly, it relates to prefetching.

Technical Background

Prefetching is used in data processing systems to bring data into a cache in advance of the time when the data is requested by processing circuitry. This removes the latency associated with handling cache misses or translation lookaside buffer misses from the critical timing path during the actual demand access made by the processing circuitry, to improve performance.

SUMMARY

At least some examples provide an apparatus comprising: an instruction decoder to decode instructions; processing circuitry to perform data processing in response to decoding of the instructions by the instruction decoder; at least one cache to cache data for access by the processing circuitry; and prefetch circuitry to prefetch data into the at least one cache; in which: in response to the instruction decoder decoding a range prefetch instruction specifying first and second address-range-specifying parameters and a stride parameter, the prefetch circuitry is configured to control, depending on the first and second address-range-specifying parameters and the stride parameter, prefetching of data from a plurality of specified ranges of addresses into the at least one cache, where a start address and size of each specified range is dependent on the first and second address-range-specifying parameters, and the stride parameter specifies an offset between start addresses of successive specified ranges of the plurality of specified ranges.

At least some examples provide a method comprising: decoding instructions; performing data processing in response to decoding of the instructions by the instruction decoder; caching data in at least one cache, for access by the processing circuitry; and prefetching data into the at least one cache; in which: in response to decoding of a range prefetch instruction specifying first and second address-range-specifying parameters and a stride parameter, prefetching of data from a plurality of specified ranges of addresses into the at least one cache is controlled depending on the first and second address-range-specifying parameters and the stride parameter, where a start address and size of each specified range is dependent on the first and second address-range-specifying parameters and the stride parameter specifies an offset between start addresses of successive specified ranges of the plurality of specified ranges.

Further aspects, features and advantages of the present technique will be apparent from the following description of examples, which is to be read in conjunction with the accompanying drawings.

BRIEF DESCRIPTION OF THE DRAWINGS

FIG. 4 shows an alternative code example using single-address-specifying prefetch instructions;

FIG. 5 illustrates a code example using the range prefetch instruction;

FIG. 6 shows a specific example of an encoding of the range prefetch instruction;

FIG. 8 illustrates a convolution operation which can benefit from use of the range prefetch instruction;

DESCRIPTION OF EXAMPLES

Figure 1:
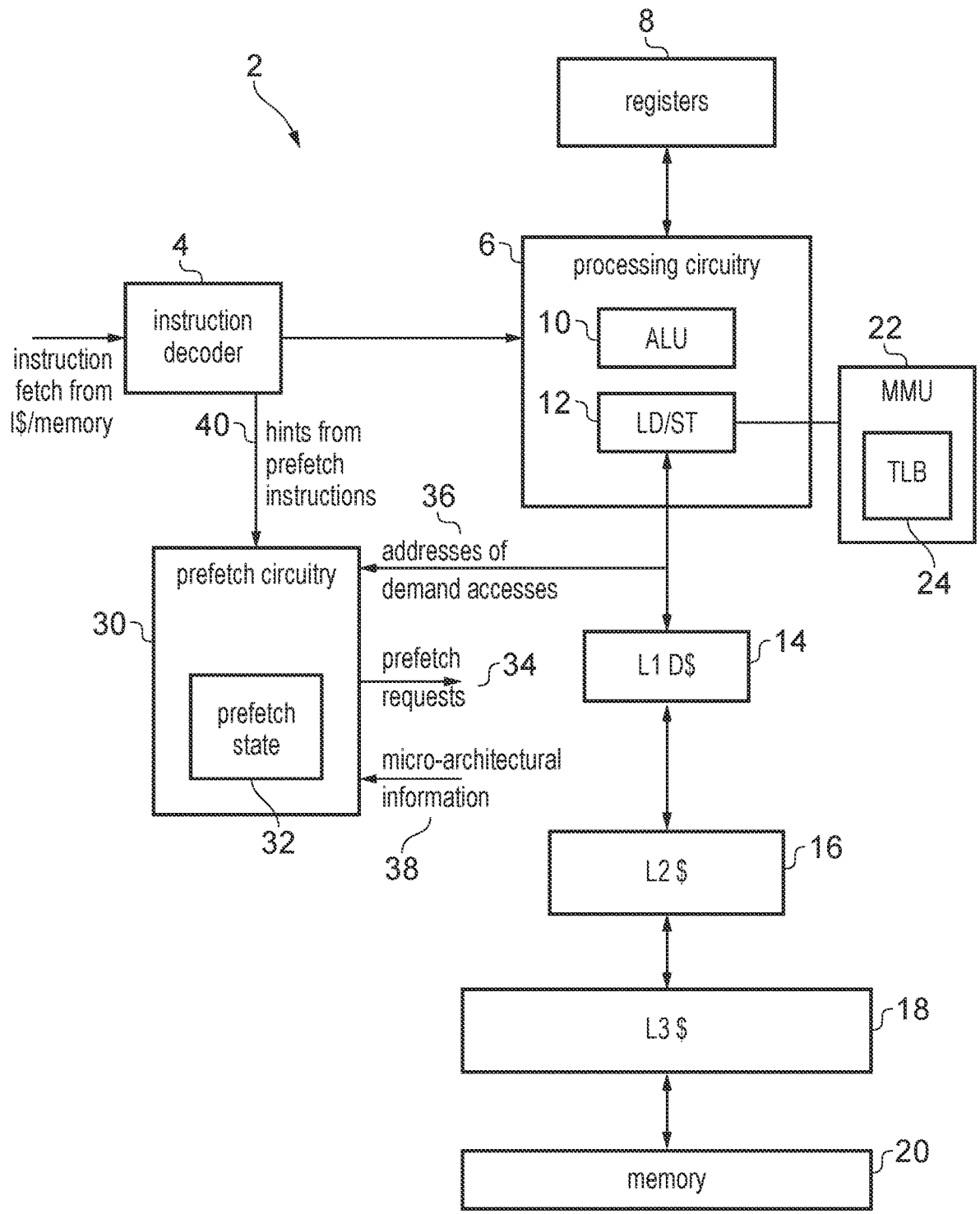
FIG. 1 schematically illustrates an example of a data processing system including prefetch circuitry.

One approach to performing prefetching may be to use hardware prefetching where prefetch circuitry implemented in hardware monitors addresses of demand access requests issued by processing circuitry to request access to data, so that the hardware prefetcher can learn the pattern of accesses being made and then subsequently issue prefetch requests to bring data for a given address into the cache in advance of an expected demand access to the same address. With typical hardware prefetchers, the prefetcher may learn from the addresses accessed on demand and from micro-architectural cues such as cache misses, to determine how to issue future prefetch requests, without explicit hints provided by software based on programmer-specified or compiler-specified parameters of software prefetch instructions. Typical hardware prefetching schemes can be effective, but may have some disadvantages. Hardware prefetchers may require a reasonable number of demand accesses to be monitored before the prefetcher can train and latch onto a stream of addresses detected in the demand accesses, and so it may be difficult to perform effective prefetching of data for the initial portion of the stream of addresses. If a particular software work load operates on very small streams then the hardware prefetcher may not have enough samples to be able to identify the stream and prefetch in a timely manner, as by the time the prefetcher has gained enough confidence in its predictions the stream may already have ended. This leads to a loss in coverage of the prefetcher and hence loss of performance. Hardware prefetchers may also require a large amount of prefetch prediction state data to be stored, to track the behaviour of demand accesses and use that to evaluate confidence in predicted address access patterns. For example, the training unit of a typical hardware prefetcher can take several tens of kilobytes of hardware budget which consumes a lot of power and energy. Another issue with typical hardware prefetchers is that they do not generally know when a stream of addresses will end, and so even once the prefetcher has been successfully trained to predict future accesses within a certain stream of addresses, the hardware prefetcher will tend to continue to prefetch lines for a distance beyond the end of the stream, after the software being executed has already moved on from that stream and has started to operate on data in other address regions. Such inaccurate prefetching may waste available memory system bandwidth and cause cache pollution (e.g. replacement of more useful cache entries with the overprefetched data) which may reduce cache hit rates for other accesses and hence cost performance.

Another approach to prefetching can be to use software prefetching, where the programmer or compiler includes within the program code to be executed a prefetch instruction which specifies a single target address of data expected to be used in future, and in response to that single-address-specifying prefetch instruction, the prefetch circuitry control prefetching of data corresponding to that single address. For example the prefetch circuitry may issue a request for a single cache line of data to be brought into a cache, in response to the single-address-specifying software prefetch instruction. By providing the software prefetch instruction, a programmer or compiler can provide an explicit indication of future intent to access a certain address, to prime the cache ready for the later demand access.

However, software prefetching using such a single-address-specifying prefetch instruction still has several disadvantages. Programmers may find it very difficult to add those software prefetch instructions into code. As each instruction specifies a single address, in practice the code will need to include a large number of such software prefetch instructions corresponding to the different addresses which the code is expected to access later. The point of the program code at which to insert the prefetch instructions may not always be obvious to the software developer. Also, it can be difficult to control the timeliness of prefetching with this approach, as the effectiveness of prefetching will depend on how far in advance of a certain demand access the corresponding single-address-specifying range prefetch instruction is inserted. If the single-address-specifying prefetch instruction is included too soon then it is possible that the prefetch data may already have been evicted from the cache by the time the subsequent demand access occurs, wasting the resource associated with performing the prefetch. If the single-address-specifying range prefetch instruction is included too late, then the prefetch data may not yet be resident in the cache by the time the subsequent demand access is encountered and so the demand access may still encounter a cache miss. Therefore, with typical software prefetch instructions specifying a single address, getting the timings correct becomes a process of trial and error and so this means that a large amount of development time is incurred in the software developer figuring out the best locations to add the software prefetch instructions.

Another problem with traditional software prefetching is that program code using the single-address-specifying software prefetch instruction becomes specific to a particular micro-architecture of the processor core and memory system. Code written according to a certain instruction set architecture may run on a wide variety of different processing systems having different micro-architectural designs, which may experience different latencies when data is fetched from memory into a cache, and may have different cache hit/miss rates, depending on properties such as the number of levels of cache provided, the size of the cache storage provided at a given cache level, the cache line size (size of the basic unit of memory transferred between memory and caches), how many other sources of access requests are competing for memory system bandwidth, and many other specific properties of a particular processor implementation in hardware. These factors mean that when code executes on one micro-architectural platform, the preferred timing for prefetching may be earlier than when the same code is executing on another micro-architectural platform. This means that it is very difficult to write code using single-address-specifying software prefetch instructions which can run across a range of micro-architectures with efficient performance. The development cost of generating different versions of code for different micro-architectures would be very high.

In the examples discussed below, an apparatus has an instruction decoder to decode instructions and processing circuitry to perform data processing in response to decoding of the instructions by the instruction decoder. At least one cache is provided to cache data for access by the processing circuitry. Prefetch circuitry is provided to prefetch data into the at least one cache. The instruction decoder supports a range prefetch instruction which specifies first and second address-range-specifying parameters and a stride parameter. In response to the instruction decoder decoding the range prefetch instruction, the prefetch circuitry controls, depending on the first and second address-range-specifying parameters and the stride parameter, prefetching of data from a plurality of specified ranges of addresses into the cache, where a start address and size of each specified range is dependent on the first and second address-range-specifying parameters, and the stride parameter specifies an offset between start addresses of successive specified ranges of the plurality of specified ranges.

Hence, the range prefetch instruction can be used by software to signal that a number of specified ranges of memory addresses will be accessed in future. The stride parameter allows a single instruction to provide a prefetch hint that there is expected to be a subsequent pattern of accesses which accesses a number of blocks of data of a certain size, which are discontiguous in the address space and are separated at constant stride intervals. This pattern of accesses may be useful for many machine learning applications for example, such as in machine learning models which use convolutions of a kernel of weights with a matrix of activation data to train a machine learning model. Such convolutions may rely on applying the kernel to different positions within the matrix and for each kernel position this may require reading of a number of relatively short chunks of data representing portions of different rows or columns in the matrix, with gaps between the address ranges accessed for the activation values used for a given kernel position. By specifying a strided pattern of discontiguous ranges it is much easier to efficiently train a prefetch circuit to learn to effectively prefetch such patterns of accesses. It will be appreciated that such convolutions are just one example of an access pattern that may be benefit from a range prefetch instruction which specifies the boundaries of a range of addresses and a stride, and other operations could also benefit from this.

The prefetch circuitry can then respond to these hints to control the way in which data from that specified range of addresses is prefetched into the cache. Compared to the single-address-specifying prefetch instruction mentioned earlier, the range prefetch instruction is much easier for a programmer or compiler to use because rather than inserting a large number of prefetch instructions corresponding to individual addresses, a single range prefetch instruction can be included specifying the addresses associated with parts of a given data structure expected to be processed. As well as simplifying software development this also greatly reduces the number of prefetch instructions needed to be included in the code, which reduces the amount of fetch, decode and issue bandwidth consumed by prefetch instructions, enabling greater throughput for other types of instructions.

The programmer using the range prefetch instruction does not need to worry about the timeliness of insertion of a given prefetch instruction relative to a demand access, as the timeliness can be controlled in hardware by the prefetch circuitry within the bounds of the specified range of addresses provided as a hint by the range prefetch instruction. The use of first and second address-range-specifying parameters and stride parameter in the range prefetch instruction also means that, compared to use of a prefetch instruction specifying a single address, the application becomes much less micro-architecture and system architecture dependent so that it is much simpler to write program code which can execute across a range of different micro-architectural processor implementations.

On the other hand, compared to typical hardware prefetching which does not use any software-specified hints provided explicitly by prefetch instructions, the use of the range prefetch instruction is beneficial because by explicitly specifying parameters identifying the boundaries of ranges of addresses expected to be accessed in future, this means that the prefetch circuitry can quickly be primed to prefetch from those ranges, rather than needing a long initial period of training when accesses start to be made from a stream of addresses with predictable properties. Hence, in practice, when accesses are made to data within a certain range corresponding to a given data structure, in a pure hardware prefetching implementation it is unlikely that the initial portion of that range will successfully be prefetched as the prefetcher may still be gaining confidence. In contrast, using the range prefetch instruction the first address-range-specified parameter can be used to identify the start of the range and hence the warmup time can be greatly reduced improving prefetch success rates and hence performance. The range prefetch instruction can be particularly useful when the stream of demand addresses that follow a predictable pattern is very small, which would be difficult to effectively prefetch with pure hardware prefetchers.

Similarly, as the size of a given one of the address ranges can be identifiable from the first and second address-range-specifying parameters, this reduces the problem of over-prefetching beyond the end of the data structure being accessed, avoiding unnecessary consumption of prefetch bandwidth and possible eviction of other data by over prefetched data which can cause performance issues in pure hardware prefetchers. In general, for a given amount of hardware circuit area budget, a prefetcher which uses the hints provided by the range prefetch instruction may provide a greater prefetch coverage (greater fraction of demand accesses that hit on previously prefetched data when they would otherwise have missed in the cache) and hence better performance than an equivalent hardware prefetcher which learns its prefetching purely from implicit cues deduced from monitoring of demand accesses and micro-architectural information such as access hit/miss information. On the other hand, for a given level of prefetch coverage, a prefetcher which can be controlled based on the range prefetch instruction may require less circuit area than a conventional hardware prefetcher not supporting the range prefetch cues received from the range prefetch instruction, as maintaining an equivalent level of performance without these range prefetch cues would typically require a much larger set of training data to be stored and compared against demand accesses.

Hence, in summary by supporting the range prefetch instruction, this can provide a better balance between prefetch coverage (performance) and circuit area and power consumption than would be possible using traditional software prefetching and hardware prefetching schemes, and also enables better programmability so that it is easier for software developers to write code including prefetch instructions.

The first and second address-range-specifying parameters may be any two software-specified parameters of the range prefetch instruction that can be used to identify the boundaries of a selected one of the ranges of addresses. For example, the selected range could be the first range of the plurality of address ranges identified using the instruction. The boundaries of other ranges could be determined by applying the offset indicated by the stride to the boundaries of the selected one of the ranges.

The first and second address-range-specifying parameters could be specified in different ways. For example, the first and second address-range-specifying parameters could each specify a memory address as an absolute address or by reference to a reference address other than the first and second address-range-specifying parameters themselves. For example, the first address-range-specifying parameter could specify the start address of a selected range and the second address-range-specifying parameter could specify the end address of the selected range, either in absolute terms of as an offset relative to a reference address such as a program counter indicating the current point reached in execution.

However, as it may be relatively unlikely that the size of the specified range is greater than a certain amount, it may take fewer bits if one of the start and end addresses to be specified relative to the other. In some examples, the start address could be specified relative to the end address. However, it may often be more natural for the start address of the specified range to be encoded as a base address in an operand of the range prefetch instruction, and the end address to be expressed relative to the start address, e.g. by a size parameter or an offset value. Hence, one useful example could be that the first address-range-specifying parameter comprises a base address (start address) of a specified range and the second address-range-specifying parameter comprises a range size parameter which specifies a size of each of the specified ranges. This would allow the end address of the specified range to be determined based on applying an offset corresponding to the specified size to the base address. The specified base and size could specify the boundaries of a first specified range, and then the stride can be used to identify the start/end of subsequent ranges in the strided group of ranges. Each of the ranges in the strided group of ranges can have the same size.

The first and second address-range-specifying parameters could be encoded in the range prefetch instruction in different ways. For example, each of the first and second address-range-specifying parameters could be encoded either using an immediate value directly encoded in the instruction encoding of the range prefetch instruction, or using a register which is identified by a corresponding register specifier within the encoding of the range prefetch instruction.

Where the first address-range-specifying parameter encodes the base address and the second address-range-specifying parameter encodes the range size a useful example can be that the first address-range-specifying parameter is encoded in a first register specified by the range prefetch instruction, and the second address-range-specifying parameter is encoded in a second register specified by the range prefetch instruction or by an immediate value directly specified in the encoding of the range prefetch instruction.

Regardless of the way in which the address-range-specifying parameters as encoded, the encoding of the address-range-specifying parameters may, in some examples, support indicating a given specified range of addresses as spanning a block of addresses corresponding to a number of bytes other than an exact power of two. For example the size of the specified range may be any arbitrary selected number of bytes up to a certain maximum size. The maximum size supported for a given specified range of addresses may be larger than the size of a single cache line, where a cache line is the size of the unit of data which can be transferred between caches or between a cache and memory in a single transfer. Hence, the range of addresses capable of being specified by the range prefetch instruction is not restricted to a single cache line and can be any arbitrary sized range so that it is not restricted to power of two sized blocks, which allows software to select the specified range to match the boundaries of the part of a certain data structure which software will process, which would not typically be possible in single-address-specifying prefetch instructions which specify a single address which will cause a single cache line to be brought into the cache corresponding to a certain power of two sized block of bytes which would therefore require further single-address-specifying prefetch instructions to be executed to prefetch other portions of a data structure spanning multiple cache lines or having a non-power of 2 size. Similarly, the encoding of the stride parameter may support indicating the offset as a number of bytes other than an exact power of 2.

Alternatively, other examples may restrict the encoding of the size and/or stride to units of a certain power of 2 number of bytes, so may not support specification of the size or stride at granularity of a single byte. For example, the size or stride parameter may specify a multiple of a certain base unit size of, say, 2, 4, or 8 bytes.

It will be appreciated that other techniques for encoding the size or stride of the ranges could also be used.

In some examples the range prefetch instruction may also specify a count parameter which indicates how many ranges separated by the stride offset are to be prefetched. This allows the prefetch to determine when prefetching from the plurality of ranges should stop. The stride parameter and count parameter could be encoded in different ways such as using an immediate value or a value in a register. It would be possible for the stride and count values to be encoded using different registers to registers used for the first or second address-range-specifying parameters.

However, in one example where the first address-range-specifying parameter specifies a base address and the second address-range-specifying parameter is specified as a size or an offset relative to the base address indicated by the first address-range-specifying parameter, this may require fewer bits for the second address-range-specifying parameter than for the first, and so there may be some spare bits in a register used to provide the second address-range-specifying parameter. Hence, in some cases at least one of the stride parameter and the count parameter could be encoded within the same register as the second address-range-specifying parameter. This reduces the number of register specifiers needed in the range prefetch instruction encoding, conserving encoding space which can be reused for other purposes.

It will be appreciated that, while the range prefetch instruction supports the stride parameter and count parameter described earlier, the range prefetch instruction may also support encodings where only a single range of addresses to be prefetched is indicated, with the boundaries of that range determined based on the first and second address-range-specifying parameter. For example, when the count parameter or stride parameter has a certain default value, this may indicate that only a single range is to be prefetched. Hence, it is not essential for all instances of the range prefetch instruction to trigger prefetching from multiple ranges separated at instances of the stride, but nevertheless the range prefetch instruction has an encoding which enables the stride parameter (and optionally the count parameter) to be determined so that the programmer has the option to use a single instruction to prime a prefetcher to prefetch data from addresses in multiple ranges separated at constant stride intervals.

The first and second address-range-specifying parameters and stride parameter provided by the range prefetch instruction may not be the only information used by the prefetch circuitry to control prefetching of data from the specified ranges of addresses in to the at least one cache. Prefetching may also depend on at least one of: monitoring of addresses or loaded data associated with demand access requests issued by the processing circuitry to request access to data; and micro-architectural information associated with an outcome of prefetch requests or the demand access requests. Hence, while the indications of the boundaries of a range of addresses expected to be needed by demand accesses can be useful to prime the prefetcher, reduce prefetch warm up time, avoid over prefetching and simplify software development for the reasons given earlier, within the specified range the prefetch hardware may have flexibility to make its own decisions as to which addresses within the specified range should be prefetched and of the timing of issuing of those prefetches. By monitoring the address and/or data of the demand access requests and micro-architectural information indicating outcomes of prefetch requests or demand access requests, the prefetch circuitry can make micro-architecture-dependent decisions to enable improved prefetch coverage for a given micro-architecture implementation, but by being guided by the range specifying parameters of the range prefetch instruction this may require less circuit area budget than alternative hardware prefetches which were not given such a range hint. Hence, the prefetching can be dynamically tuned by the prefetch circuitry in hardware but guided by the information on the range boundaries provided by the range prefetch instruction as defined by the software. Loaded data associated with demand access requests could, for example, be used to control prefetching, e.g. in scenarios where it is recognised that loaded data from memory could be used as a pointer used for determining an address of a subsequent access, the information from the loaded data of one demand access could be used to predict which addresses may be accessed in future.

Where micro-architectural information is used to tune prefetching, this micro-architectural information could comprise any one or more of: prefetch line fill latency (indicative of the latency between issuing a prefetch request and the corresponding prefetch data being returned to the at least one cache), demand access frequency (the frequency with which demand access requests are issued by the processing circuitry), demand access hit/miss information (e.g. providing information indicative of the fraction of demand access requests which hit or miss in a given level of cache, in some cases this information could be maintained for different levels of caches), demand access prefetch hit information (e.g. indicating the fraction of demand access requests which hit on previously prefetched data, as opposed to hitting on data previously fetched on demand in response to a demand access), and prefetch usefulness information (e.g. an indication of the fraction of prefetch requests for which the prefetched data is then subsequently used by a demand access before the prefetched data is evicted from the cache). Any given implementation does not need to consider all of these types of micro-architectural information. Any one or more of these types can be considered.

The prefetch circuitry may control, based on monitoring of addresses or loaded data associated with demand access requests issued by the processing circuitry to request access to data or micro-architectural information associated with an outcome of prefetch requests or the demand access requests, a timing at which a prefetch request is issued for a given address within the plurality of specified ranges. This differs from conventional software prefetch instructions which would normally act as a direct trigger for the specified address to be prefetched, rather than leaving flexibility for the hardware to decide the exact timing. Hence, the prefetch range instruction can be seen as a mechanism for software to prime a prefetcher with hints as to future address access patterns, rather than a trigger for the prefetch to necessarily happen right way, so that hardware can make the final decision on prefetch timing depending on micro-architectural cues and the software can be more platform-independent.

In some examples, the prefetch circuitry may have sparse access pattern detecting circuitry to detect, based on monitoring of addresses of demand access requests, a sparse pattern of accessed addresses within a given specified range of the plurality of ranges of addresses indicated by the range prefetch instruction, and to select which specific addresses within the specified range are to be prefetched based on the detected sparse pattern. Micro-architectural implementations which have sparse access pattern detecting circuitry can therefore benefit from use of the range prefetch instruction even when the expected usage pattern is sparse so that not all the addresses within a given specified range are likely to be accessed. For example, the sparse access pattern detecting circuitry could have training circuitry which may monitor sequences of addresses to detect strided address patterns or alternating sequences of stride intervals within a stream of demand addresses, and store prediction state information indicative of the detected patterns and an associated level of confidence, to learn which addresses are the most effective to prefetch. However, by being guided by the address-range-specifying parameters from the range prefetch instruction, this can prime the sparse access pattern detecting circuitry quicker to enable better prefetching of an initial portion of the specified range, and also the hints from the range prefetch instruction can indicate to the sparse access pattern detecting circuitry when the detected pattern will end and therefore avoid over-prefetching.

Note that, in the case where the range prefetch instruction specifies a plurality of specified ranges using the stride parameter, the sparse access pattern detecting circuitry could still be applied to detect further strided patterns of address accesses within an individual one of those specified ranges. In that case, the specified ranges identified by the range prefetch instruction could be interpreted as the boundaries of the regions within which future demand accesses may be needed, but the sparse access pattern detecting circuitry may learn which specific addresses in those regions are actually accessed and train the prefetch circuitry accordingly.

Other implementations may not have the sparse access pattern detecting circuitry and may choose to use a simpler hardware implementation of the prefetch circuitry, which may assume that the access pattern within a given specified range is a dense access pattern so that each address in the specified range should be prefetched.

Another aspect of prefetch control which may be controlled in hardware may be an advance distance used to control how far ahead a stream of prefetch addresses of the prefetch requests issued by the prefetch circuitry is in comparison to a stream of demand addresses of demand access requests issued by the processing circuitry to request access to data. Based on the advance distance, the prefetch circuitry may control the timing at which a prefetch request for a given address is issued.

It can be useful for the prefetch circuitry to define the advance distance, independent of any explicit specification of the advance distance by the range prefetch instruction (or any implied specification of the advance distance based on the position of the range prefetch instruction relative to other code). For example, the setting of the advance distance may be based on the particular micro-architectural implementation of the prefetch circuitry, which may be independent of the software code as the same software code could be executed on different micro-architectural implementations. By not needing the software to control the advance distance (unlike in approaches using single-address-specifying prefetch instructions where the programmer will need to consider the point at which the software prefetch instructions inserted based on the expected advance distance which is estimated to be useful), this makes it much easier for a software developer to generate platform-independent code which can run efficiently across the range of micro-architectures. For example, the prefetch circuitry may tune the advance distance based on micro-architectural information associated with an outcome of the prefetch requests of a demand access request. This micro-architectural information can be any of the types of micro-architectural information mentioned earlier.

Different micro-architectural implementations of the prefetch circuitry may respond to the range prefetch instruction in different ways. A simple approach could be simply to issue prefetch requests corresponding to addresses in the specified ranges (or at least, the addresses in the first of the specified ranges) directly as a response to the range prefetch instruction. However, in practice this may risk the prefetching of later portions of the specified range wasting memory bandwidth as it may be more likely that by the time the demand access stream has reached the later portions of the specified range the previously prefetched data may already have been evicted from the cache and so is no longer benefitting from the prefetching. Another approach could be that no prefetch requests are issued directly as a response to the range prefetch instruction, but the range-specifying parameters and stride may be used to store information about the boundaries of the specified ranges of addresses which can then, upon detection of a demand access request for an address within the specified range, be used to quickly latch onto the newly detected stream of addresses and trigger further prefetching of subsequent addresses within that range. However, while this approach may still provide better performance than pure hardware prefetching approaches which do not use any software prefetch instructions, waiting for the demand accesses to reach a given specified range of addresses may risk prefetch coverage being less effective for an initial portion of the given specified range of addresses, because by the time a first demand access reaches that range it may be too late to prefetch data from that initial portion in time for the demand accesses to the initial portion to make use of the prefetched data.

Therefore, one useful approach can be that, as a response to the instruction decoder decoding the range prefetch instruction, the prefetch circuitry may trigger prefetching of data from an initial portion of a first specified range of the plurality of specified ranges into the at least one cache. This prefetching of the initial portion may be performed directly as a response to the range prefetch instruction, independently of whether any demand accesses have been detected associated with addresses within the specified range. By prefetching data from the initial portion as a direct response to the range prefetch instruction, this can improve prefetch coverage and subsequent demand access cache hit rates, reducing the warm up penalty associated with traditional hardware prefetchers.

The size of the initial portion prefetched in response to the range prefetch instruction may be defined in hardware by the prefetch circuitry independent of any explicit specification of the size of the initial portion by the range prefetch instruction. Hence, it is not necessary for software to specify how much of the specified range should be prefetched as the initial portion directly in response to the range prefetch instruction. The size of the initial portion may be fixed for the specific micro-architecture by the hardware designer, or can be tuneable dynamically (at runtime) based on micro-architectural information on outcomes of prefetch requests or demand access requests as described earlier. This enables different micro-architectures executing the same code to make their own decisions as to how much initial data to prefetch as a response to the range prefetch instruction. The size of the initial portion could depend on parameters such as the number of cache levels provided, size of cache capacity at different levels of the cache, latency in accessing memory, frequency or volume of other accesses being made to the memory system, etc.

Having prefetched the initial portion of the specified range, prefetching of data from a given address within a remaining portion of the first specified range may not occur directly as a response to the range prefetch instruction. Instead, the prefetch circuitry may trigger prefetching of data from a given address within the remaining portion in response to detecting the processing circuitry issuing a demand access request which specifies a target address which is ahead of the given address by a given distance or less. By deferring the prefetching of data from a given address until the demand accesses reach an address within the given distance of the given address, this makes it more likely that the prefetched data for the given address is still resident in a given level of cache at the time when the subsequent demand access request to that address is issued, increasing the cache hit rates and improving performance. Again, the size of the given distance may not be defined in software and can be determined in hardware by the prefetch circuitry independent of any explicit specification of a given distance by the range prefetch instruction. Again, the given distance can be either a fixed distance set for a particular micro-architectural implementation (which could differ from the given distance set on other micro-architectural implementations supporting the same program code), or could be tuneable at runtime based on micro-architectural information as described earlier. For one micro-architecture it may be useful for the given distance to be larger than on another, to account for differing delays in bringing data into a given level of cache.

Both the size of the initial portion and the given distance mentioned in the preceding paragraphs are examples of parameters representing the advance distance mentioned earlier which governs how far ahead of the stream of demand addresses the stream of prefetch addresses is issued.

When the range prefetch instruction specifies multiple ranges using the stride parameter, the prefetching of second, third and further ranges of the plurality of specified ranges can be controlled in different ways. For example, the prefetching circuitry could monitor demand accesses to decide when to these streams. For example, prefetching from a given specified range could start when the demand accesses have reached within a given distance of the end of the previous specified range.

Also, some implementations of the prefetch circuitry may not always take the same approach for controlling prefetch timing. For example, the preferred prefetch timing could be different for ranges smaller than a certain threshold compared to ranges larger than the threshold. It will be appreciated that the examples of particular prefetch timing control described here are just one example, and other implementations may choose a different approach.

The prefetch circuitry may be configured so that, following decoding of the range prefetch instruction by the instruction decoder, prefetching for a given specified range may be halted when the prefetch circuitry identifies, based on the second address-range-specifying parameter, that an end of the given specified range has been reached by a stream of prefetched addresses prefetched by the prefetch circuitry or a stream of demand addresses specified by demand access requests issued by the processing circuitry. This would not be possible in typical hardware or software prefetching schemes using single-address-specifying prefetch instructions. Hence, by preventing over-prefetching beyond the end of the specified range, this avoids polluting the cache with unnecessary data which is not likely to be used and helps to preserve the cache capacity for other data which may be more useful, improving performance.

In some examples, the range prefetch instruction may also specify one or more prefetch hint parameters for providing a hint about data associated with the specified range, and the prefetch circuitry may control, depending on the one or more prefetch hint parameters, prefetching of data from the specified ranges of addresses into the at least one cache. For example, the prefetch hint parameters could be any information, other than information identifying the addresses of the specified ranges, which provides a clue as to an estimated usage of the data within the specified ranges which could be used to control the prefetching.

For example, the one or more prefetch hint parameters may include any one or more of:

a type parameter indicative of whether the prefetched data is data expected to be subject to a load operation, data expected to be subject to a store operation or instructions to expected to be subject to an instruction fetch operation. If the data is expected to be subject to a load or store operation then this may trigger prefetching the data into a data cache while if the prefetch data is expected to be instructions then the prefetching may be into an instruction cache. Hence the target cache (which is to be the recipient of the prefetched data) may be selected depending on the type parameter. Also the indication of whether data is expected to be subject to a load or store operation can be useful for selecting the coherency state in which the prefetched data is to be requested. For example, in a system having multiple caches which cache data from a shared memory system, a coherency scheme may be used to manage coherency between different cached copies for a given address. When data is expected to be subject to a store operation so that the software which uses the cached data will update the data value associated with the corresponding address, then it may be preferred to obtain a cached copy of the data in a unique coherency state, so that other copies of the data from the same address in other caches are invalidated to avoid those other caches retaining out of date data following the store operation. On the other hand, for data fetched into a cache which will only be subject to a load operation, it may be possible to bring the data into the cache in a shared coherency state where corresponding versions of the data from the same address may still be resident in other caches as the load will not be expected to overwrite the data. Therefore, it can be useful for the prefetch circuitry to control the coherency state in which the data from the specified ranges of addresses is prefetched, based on the type parameter provided as a prefetch hint parameter of the range prefetch instruction.

a data usage timing parameter indicative of at least one of: an indication of how soon the prefetched data associated with the specified ranges is estimated to be requested by the processing circuitry after the range prefetch instruction, and a target level of a cache hierarchy into which the data is to be prefetched. The data usage timing parameter could be used to influence the advance distance with which prefetch requests are issued relative to the estimated demand accesses and/or which level of the cache hierarchy data is prefetched into. The data usage timing parameter could be expressed in different ways. In some cases it could simply be a vague relative indication of whether data may be needed "soon" or "not soon" (or could indicate more than two qualitative levels of expected usage timing), but it is not necessary to quantify any particular usage timing. In some cases, how the prefetch circuitry responds to a certain usage timing parameter value may be micro-architecture dependent, and so while the software may use the data usage timing parameter to express a vague intention of the relative timing when accesses to specified addresses are likely to be needed, different micro-architectural implementations may respond in different ways to that vague indication. Other implementations may specify the data usage timing parameter more explicitly by for example specifying a particular level of cache hierarchy into which data is to be prefetched.

a data reuse timing parameter indicative of at least one of: an indication of an estimated interval between a first demand access to the prefetched data and a further demand access to the prefetched data, or a selected level of a cache hierarchy into which the prefetched data is preferred to be evicted if replaced from a given level of the cache hierarchy. The data reuse timing parameter can be used to control cache replacement of entries in the cache. While the data usage timing parameter mentioned above is a hint about the timing of the first demand access to the prefetched data after prefetching, the data reuse timing parameter is a hint about the timing of a subsequent access after that first demand access. When prefetching data, the data reuse timing parameter could be used to set metadata associated with the prefetched data in the cache, which can be used for deciding whether to evict the prefetched data when another address is to be allocated to the cache (e.g. a cache entry indicated as being less likely to be reused soon could be preferred for eviction in comparison to a cache entry indicated as being more likely to be reused soon), or deciding, if the prefetched data is to be evicted, which subsequent level of cache should be allocated with the evicted data. Again, the data reuse timing parameter could be a relatively precise indication of expected interval between the first demand access and further demand access (e.g. an approximate indication of a number of instructions or number of memory accesses), or an indication of a specific level of cache to evict data to, or could be a vague relative indication of whether the data is likely to be needed "soon" or "not soon" after the first demand access to that data (or an indication of more than two qualitative levels of expected data reuse timing). Again, the specific way in which a particular micro-architectural implementation of the prefetch circuitry or the cache uses the data reuse timing parameter may vary from implementation to implementation.

an access pattern hint indicative of relative denseness/sparseness of a pattern of accesses to addresses within the specified ranges, or of a sparse access pattern type. This type of prefetch hint can be useful to allow the prefetch circuitry to determine whether it should prefetch all addresses within the specified ranges or only prefetch some addresses. For example, the access pattern hint could be used by the prefetch circuitry to determine whether it is worth expending resource on training the sparse access pattern detecting circuitry described earlier to learn a particular sparse access pattern within a given specified range. In some cases, the access pattern hint could simply indicate some relative indication of denseness or sparseness, for example, a single bit indicating whether the access is dense (i.e. all or nearly all addresses are expected to be accessed) or sparse (fewer addresses are expected to be accessed from the specified ranges). Other implementations may provide finer granularity of the specification of the relative denseness/sparseness. Some examples may specify a particular sparse access pattern type. For example the sparse memory access pattern type could indicate whether the access pattern is likely to be strided, spatial, temporal, random etc. Such a hint on the expected access type can be useful to simplify training of a sparse pattern detector.

a reuse likelihood parameter indicative of a likelihood of whether data prefetched from the specified ranges of addresses is expected to be used once or to be used multiple times. Such a reuse likelihood parameter can be used to control how long data prefetched from the specified range of addresses is retained in the cache after being prefetched or being accessed by a demand access. For example the reuse likelihood parameter could be indicative of whether the stream of accesses to the specified ranges of addresses is expected to be a non-temporal (streaming) type of access where it is likely that each access to a given address within those ranges will use the data once and then that address may not be needed again, or whether the access is a temporal pattern of access where data prefetched from a given address within the specified ranges is likely to be accessed more than once or greater than a certain number of times. The reuse likelihood parameter can therefore be used by the prefetch circuitry to control storage of some metadata associated with the prefetched data in the cache which may then be used to decide whether to prioritise prefetched data for eviction after it has been accessed by a demand access.

a non-prefetch hint parameter indicative that prefetching of data from the specified ranges should be suppressed. In some examples, the prefetch range instruction may also support an encoding where a non-prefetch hint parameter can be provided which indicates that the prefetch circuitry should not prefetch any data from the specified range. This could be useful because it may avoid the prefetch circuitry expending training resource on learning information about access patterns within the specified ranges. This can be useful to preserve prefetch training resources for other ranges of addresses where the benefits of prefetching may be greater.

Any given implementation of the range prefetch instruction does not need to support all of these types of prefetch hint parameters. Any one or more of these prefetch hint parameters may be supported (or none of these prefetch hint parameters may be supported). The encoding of the prefetch hint parameters may vary significantly from implementation to implementation. In some cases encoding of two or more of these hint parameters may be combined into a single field with different prefetch hint code values specified in that field being allocated to different patterns of combinations of prefetched hints. Hence, it is not essential for each prefetched hint parameter to be identified using an entirely separate parameter of instruction although this is also possible.

In some examples, the prefetch circuitry may set, depending on the one or more prefetch hint parameters, cache replacement hint information or cache replacement policy information associated with data prefetched from the specified range specified by the range prefetch instruction. The cache may then control replacement of cache entries based on the cache replacement hint information or cache replacement policy information set by the prefetch circuitry. Here, the cache replacement policy information could be information which directly is used by the cache to control replacement of cache entries, e.g. for controlling selection of which of a candidate set of entries should be the entry replaced with newly allocated data. For example, the cache replacement policy information could be least recently used (LRU) information for determining which of a set of candidate cache entries has least recently been accessed, or could specify a priority scheme indicating a relative level of priority of a given cache entry for a replacement. In general, any known cache replacement policy may be used, but with the approach where the range prefetch instruction specifies prefetch hint parameters these hints may be used to set this cache replacement policy information associated with a given cache entry when data from the specified range is prefetched to that entry. Alternatively, the use of the prefetch hint parameters may not directly affect the setting of the replacement policy information associated with particular cache entries, but may merely be used to set cache replacement hint information which may indirectly control the cache replacement, such as a hint that entries associated with addresses for a given address range could be more or less favoured for eviction. The cache replacement hint information can also be information which indicates that a given entry of the cache could be evicted (or marked as prioritised for eviction) after the first demand access hitting on that entry. It will be appreciated that there are many ways in which cache replacement can be implemented by the prefetch hint parameters but in general the prefetch circuitry can use the prefetch hint parameters of the range of prefetch instruction to influence cache replacement so that it is more likely that cache hit rates can be maintained higher based on the expected pattern of usage indicated by software using the prefetch hint parameters.

Example Data Processing Apparatus

FIG. 1 schematically illustrates an example of a data processing apparatus 2. The apparatus includes an instruction decoder 4 to decode program instructions fetched from an instruction cache or from memory. Based on the decoded instructions, the instruction decoder 4 controls processing circuitry 6 to perform data processing operations corresponding to the instructions. The processing circuitry 6 has access to registers 8 which are used to provide operands for instructions and for storing the results of processed instructions. Processing circuitry 6 includes a number of execution units 10, 12 for executing different classes of program instruction. As an example, FIG. 1 shows the processing circuitry 6 including an arithmetic/logic unit (ALU) 10 for performing arithmetic or logical operations, and a load/store unit 12 for performing load operations to load data from the memory system to the registers 8 or store operations to store data from the registers 8 to the memory system. It will be appreciated that these are just some examples of possible execution units and it is possible for other types of execution units to be provided or for multiple execution units of the same type to be provided.

The memory system in this example includes the instruction cache (not shown in FIG. 1 for conciseness), several data caches 14, 16, 18 implemented in a cache hierarchy, and memory 20. In this example, the cache hierarchy includes three levels of cache including a level 1 data cache 14, a level 2 cache 16 and a level 3 cache 18. Some of these caches could also be used for instructions (e.g. the level 2 or level 3 caches may be shared for data and instructions). Other examples could have a different number of caches in the hierarchy or a different organisation of data caching relative to instruction caching.

When a load/store operation is performed in response to a load/store instruction decoded by the instruction decoder 4, a virtual address specified using operands of the load/store instruction is translated to a physical address by a memory management unit (MMU) 22, based on address mapping information specified in page table entries of a page table structure which is stored in the memory system. Information from the page table structure can be cached within the MMU 22 in a translation lookaside buffer (TLB).

The address of a load/store operation is looked up in the caches and if there is a hit in a given level of cache 14, 16, 18 then the data can be made available faster than if the data has to be fetched from memory 20. Hits in caches higher up in the cache hierarchy (e.g. in the level 1 data cache 14) allow data to be made available faster than hits in lower levels of the cache hierarchy closer to memory 20, but the higher levels of cache such as the level 1 have a smaller capacity and so there is a trade-off between cache access latency and capacity at each level.

The data access requests issued by the load/store unit 12 are demand access requests issued on demand based on the addresses specified by load/store instructions of the software program being executed. If data is not brought into the caches 14, 16, 18 until the program reaches the point of execution at which the corresponding load/store instruction is executed then there may be additional latencies caused by cache misses, as there is a delay while data is brought in from a lower level cache or from memory. Also, if the virtual address for a demand access misses in the TLB 24, then the MMU 22 may need to perform a page table walk to traverse page table structures stored in memory to locate the address mapping information for translating the virtual address. Such page table walks can cause a significant delay in processing the demand access.

Prefetch circuitry 30 is provided to bring data into a given level of cache 14, 16, 18 in advance of the time when the processing circuitry 6 will issue the corresponding demand access request to the prefetched address. This means that the delay associated with a TLB miss or cache miss can be encountered at the time of performing the prefetch, instead of at the time of the demand access, and so when prefetching is successful this reduces the critical timing path of processing a demand access which would otherwise have missed in the cache.

The prefetch circuitry 30 can use various sources of information to maintain a set of prefetch state information 32 which can be used to predict which addresses may be needed by future demand accesses, and based on the prefetch state information 32 may issue prefetch requests 34 requesting that data for certain prefetch addresses are brought into a certain level of cache 14, 16, 18. For example the information used to predict the prefetch addresses may include the stream of demand addresses 36 specified by demand access requests issued by the load/store unit 12, micro-architectural information 38 indicating information about the outcome of demand access requests issued by the load/store unit 12 or prefetch requests 34, as well as software defined hints 40 which are obtained from prefetch instructions decoded by the instruction decoder 4. The demand addresses 36 could be either virtual addresses or physical addresses—it would be possibly to train the prefetch circuitry 30 on either.

Software Vs Hardware Prefetching

Software prefetches are employed to bring cache lines into the cache in advance before they are accessed in the future. This removes the cache fill and TLB fill latencies out of the critical path during the actual demand access thereby improving the performance. Traditional software prefetches bring in only one cache line at a time (as the software prefetch instruction specifies only a single address). The alternative is to rely on a hardware prefetcher to learn a pattern of accesses and issue prefetches in advance of a demand access achieving the same benefits. However, both traditional software prefetches and hardware prefetching have several drawbacks.

Drawbacks of Traditional Software Prefetching:
1. Programmers find it difficult to add traditional software prefetch instructions which specify a single address. The pattern of accesses is not obvious in software. And, getting the timelines correct becomes a process of trial and error. It is very difficult to get it working perfectly.
2. Kernels with traditional software prefetches become micro-architecture and system architecture specific. Even the size of cache line (basic unit of memory being prefetched) changes between implementations. It is bound to break when run on a different system.
3. If a system supports a scalable vector architecture, in which the instruction set architecture allows micro-architecture designers to choose different sizes for the vector registers and the instruction set architecture is designed to permit the same code to run on different micro-architectures with different vector size, this makes development of code using software prefetch instructions even harder as the vector length is unknown, so it is impossible to add prefetches at the correct rate in a general manner even if conservative assumptions about cache line length are made.
4. If it turns out that the software prefetching actually hurts performance instead of improving performance (e.g. because the prefetch timeliness was not correct, so there was no performance benefit to the prefetch, and the prefetch caused other data to be evicted which then caused an additional cache miss), there is no way of fixing this at runtime and the code will need to re-written.
5. Traditional software prefetches target a single line. Trading off between code bloat, complexity and accuracy is tough. For example, software might end up over-prefetching to avoid duplicating a loop omitting prefetches.

Drawbacks of Traditional Hardware Prefetching:
1. Hardware prefetchers take several demand accesses to train and latch on to a stream. If the streams are tiny, then the hardware prefetchers do not have enough samples to identify the stream and prefetch in a timely manner. This leads to a loss in coverage.
2. If there are too many parallel streams with interleaved accesses between the stream, the hardware prefetcher will find it ever more difficult to identify and latch on to streams. The training unit of a hardware prefetcher could take up several 10's of KB in hardware budget and could also consume a lot of power and energy.
3. Hardware prefetchers do not know when a particular stream of accesses ends. And so tends to prefetch lines beyond the end of the stream. Such inaccurate prefetching may hog available bandwidth and will cause cache pollution.

Range Prefetch Instruction

Figure 2:
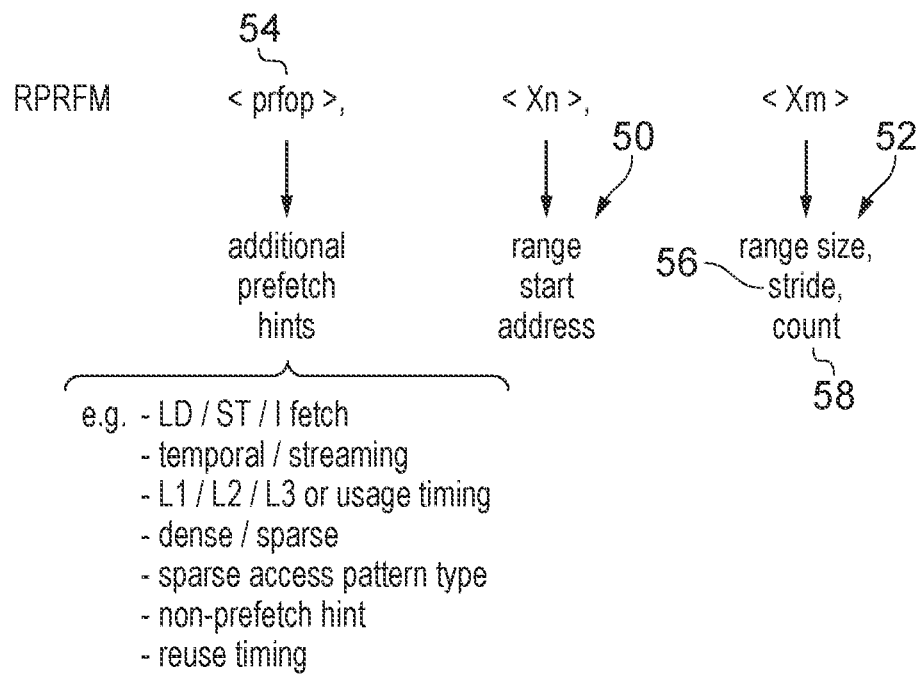
FIG. 2 illustrates an example of a range prefetch instruction.

FIG. 2 illustrates a range prefetch instruction which can help to address these drawbacks. The instruction set architecture supported by the instruction decoder 4 and processing circuitry 6 may include a range prefetch instruction which specifies first and second address-range-specifying parameters 50, 52 and a stride parameter 56. In this example, the instruction also specifies additional prefetch hints 54 and a count parameter 58.

In this example, the first address-range-specifying parameter 50 specifies a range start address (also referred to as a base address) which identifies the start of a specified range of addresses. The second address-range-specifying parameter 52 specifies the size of the specified range, and so implicitly identifies the end address of the range relative to the start address. The end address can be determined by adding a value corresponding to the specified to the start address. An alternative way of specifying the first and second address-range-specifying parameters could be to define the start address using a size or offset parameter defined relative to the end address. Also it would be possible to specify both start and end addresses as absolute addresses or relative to a separate reference address other than the range boundary addresses, rather than specifying one of the start/end addresses relative to the other. The size of the address range may be encoded using parameters that support the size being an arbitrarily selected non-power of two number of bytes, so the size is not restricted to be in power of two block sizes.

For some encodings of the range prefetch instruction, the instruction may specify a single range of addresses. For example, this could be the case when the stride parameter 56 is set to a default value such as 0, or the count parameter 58 is set to a default value such as 0 or 1, or another portion of the instruction encoding has a value indicating that there is only one range to be prefetched.

For other encodings, the range prefetch instruction represents multiple ranges separated at intervals of the specified stride parameter 56, and the count parameter 58 can indicate how many ranges are to be represented. This will be discussed in more detail below with respect to FIGS. 6 and 7.

In the example of FIG. 2 both the first and second address-range-specifying parameters are encoded as data stored in registers specified by the range prefetch instruction, where the range prefetch instruction includes register specifiers Xn, Xm for identifying the registers storing the first and second address-range-specifying parameters. However, other approaches could use an immediate value to specify an address-range-specifying parameter, for example the range size could be defined as an immediate value. The stride value 56 and count value 58 could also be specified in further registers or an immediate value, but in this example these are specified in the same register as the range size 52 as described in FIG. 6 discussed below.

Optionally, the range prefetch instruction can also specify one or more additional prefetch hints which can be useful for controlling prefetching. For example, the range prefetch instruction shown in FIG. 2 includes a prefetch operation field 54 which could be specified either in a register referenced by the instruction or as an immediate value, and may have an encoding which identifies one or more of a number of types of prefetch hint information, such as:

Load/store/instruction type information identifying whether the addresses within the range(s) defined by the parameters 50, 52 are expected to be used by future load operations, store operations, or instruction fetches—this can be useful for controlling whether to prefetch into a data cache or instruction cache, or for controlling the coherency state set for the prefetched data;

A reuse likelihood parameter, such as an indication of whether the addresses in the specified range(s) are likely to be used for a streaming access pattern of loads where data from each address is likely to be used only once (or relatively few times), or a temporal pattern of accesses where data from a given address within the specified range is likely to be used more than once (or a relatively large number of times);

A data usage timing parameter, such as an indication of a target level of the cache hierarchy into which the data is to be prefetched, or a relative indication of how soon the data associated with the specified range(s) is estimated to be requested by the processing circuitry after the range prefetch instruction, which can be useful for controlling timing at which prefetch operations are issued and/or controlling which level of the cache hierarchy the prefetch data is prefetched into;

A data reuse timing parameter, such as an indication of a selected level of the cache (e.g. L2 or L3) into which the prefetched data should be evicted when replaced in a given level of cache (e.g. L1), or a relative indication of how soon after a first demand access to the address of the prefetched data a further demand access to the same address is expected to be issued;

An access pattern hint indicative of a relative denseness/sparseness of a pattern of accesses to addresses within the specified range(s), or of a specific sparse access pattern type, such as whether the access is likely to be strided, spatial, temporal, or multi-strided;

Non-prefetch hint information indicating that the subsequent program code is unlikely to use data from addresses within the specified range defined by the first and second address-range-specifying parameters 50, 52.

Any given implementation of the range prefetch instruction can select to implement any one or more of these types of prefetching and it is not necessary to encode all of these. The prefetch hint information can be useful to allow the prefetch circuitry 30 to modify how it controls issuing of prefetch requests for addresses within the specified range(s).

Hence, a range prefetch instruction is proposed which signals one or more ranges of memory addresses that will be accessed in the future. If the range prefetch instruction is executed on a micro-architecture which has prefetch circuitry 30, the range prefetch instruction may program a hardware backend of the prefetch circuitry 30, which is in charge of issuing prefetches in a timely fashion by using micro-architecture cues such as current activity patterns and tracking progress in the installed range. The range prefetch instruction will allow the hardware backend to bypass the training stage and start issuing accurate prefetches directly.

The range prefetch instruction could handle dense or sparse accesses to the encoded address range. The range prefetch instruction also encodes a stride and count parameter to handle more complex access patterns. The range prefetch instruction may also rely on the hardware to detect complex patterns of accesses within the encoded address range(s) such as: multi-strided patterns, spatial patterns, temporal patterns etc. The hardware backend may also provide hints to the cache replacement policy to make smarter replacement decisions (e.g. the prefetch circuitry 30 can control setting of cache replacement information associated with cache entries which is used to decide which cache entry to replace when new data needs to be allocated to a given cache 14, 16, 18—e.g. setting cache entry metadata used in a least recently used (LRU), re-reference interval prediction (RRIP) or any other known cache replacement policy).

From an architectural point of view, the range prefetch instruction is not required to cause any operation to be performed—it is acceptable for a particular micro-architectural processor implementation to ignore the range prefetch instruction and treat it as a no-operation (NOP) instruction. For example, processor implementations which do not have any prefetch circuitry 30 or do not have prefetch circuitry that would support use of the hints 40 available from the range prefetch instruction can treat the range prefetch instruction as a NOP.

However, on those micro-architectural implementations which do support prefetch circuitry 30 which can use the hints from the range prefetch instruction, there are several advantages.

Addressing drawbacks of traditional software prefetching:

One range prefetch instruction can be provided for an entire set of one or more ranges. This instruction can be placed once outside an inner loop. The hardware backend is in charge of issuing prefetches in a timely fashion. Therefore, the application becomes more micro-architecture and system architecture independent. The associated backend also allows us to detect if the range prefetching is actually detrimental to performance. For example, the prefetch circuitry 30 has the flexibility to selectively turn off prefetching for certain ranges if it is found that prefetching harms performance.

Addressing drawbacks of traditional Hardware Prefetching:

As the range prefetch instruction gives precise hints on start address and range of a stream of addresses, the range prefetch instruction and its simple hardware backend can achieve much higher accuracy and only uses a fraction of the hardware overhead of traditional hardware prefetchers.

Programmability Benefits:

As can be seen in FIG. 5 discussed below, it is extremely simple and elegant to add a range prefetch instruction to an existing application. So in addition to the performance benefits, the ease of programming is a major benefit of this instruction. As an example, for one use case with depthwise convolution kernels, an engineer took half a day to try and add traditional software prefetch instructions to the depthwise convolution kernel which ended up achieving a small amount of speedup. In contrast, adding the range prefetch instruction took about 10 minutes and the performance improvement was much greater than when the traditional software prefetch instruction was used.

Example of Range-Based Prefetch Control

Figure 3:
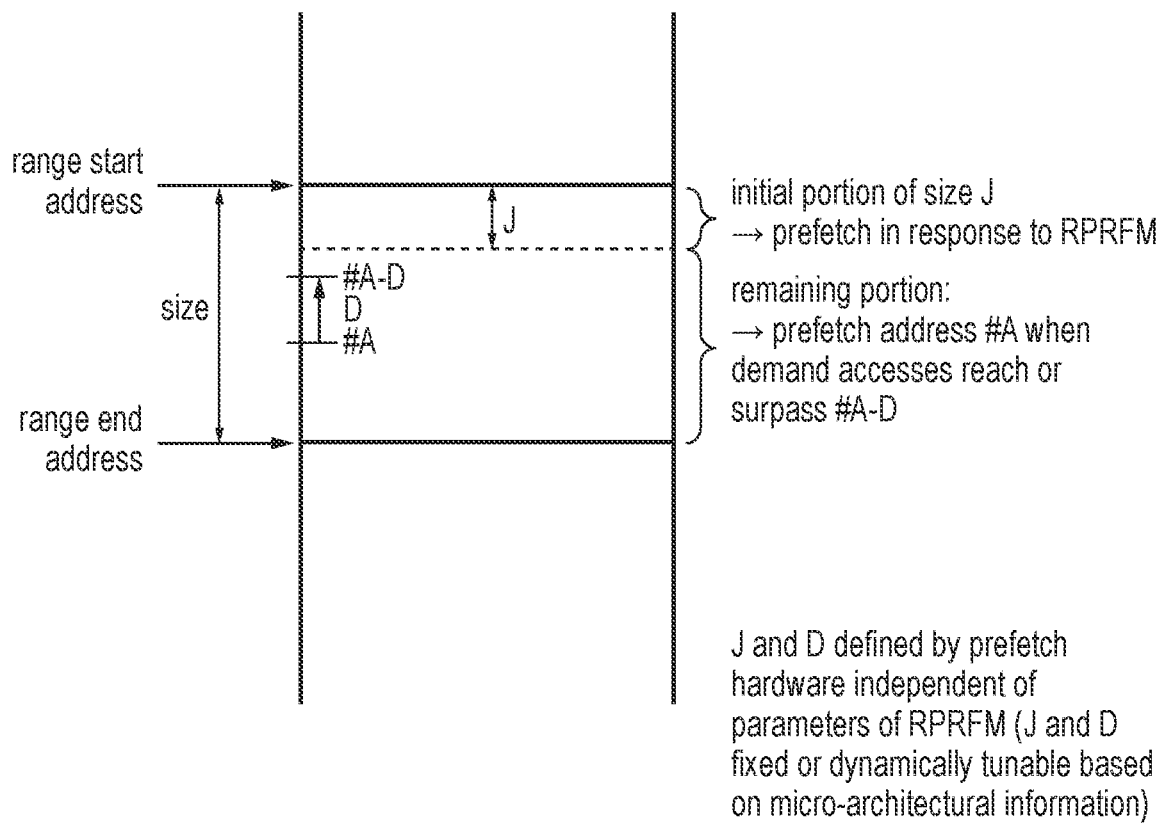
FIG. 3 illustrates an example of using first and second address-range-specifying parameters of the range prefetch instruction to control prefetching from a given specified range.

FIG. 3 illustrates an example of how the prefetch circuitry 30 may control prefetching based on the parameters of the range prefetch instruction. FIG. 3 shows control for a single range, e.g. the first range of multiple ranges specified by the range prefetch instruction if the stride parameter is used to encode multiple ranges.

In response to the instruction decoder 4 decoding the range prefetch instruction, the address parameters 50, 52 (and additional prefetch hints 54 if provided) can be provided to the prefetch circuitry 30. For example the prefetch circuitry may record information identifying the start and end addresses of the range in the prefetch state storage 32. As a response to the decoding of the prefetch instruction, the prefetch circuitry may issue prefetch requests 34 corresponding to addresses within an initial portion of the range, where the initial portion is of a certain size J.

If the overall size of the range is very small (e.g. less than the size J defined for the initial portion), for example only two or three cache lines, then the entire range could be prefetched as a direct response to the range prefetch instruction, and there may be no need for subsequent additional prefetching in response to demand access requests relating to that range.

However, for larger ranges specified by the range prefetch instruction, it may not be efficient to prefetch the entire range in response to the decoding of the range prefetch instruction, because this would risk the prefetches for later addresses in the range being useless (as by the time the demand accesses issued by the load/store unit 12 actually reach those later addresses the prefetched data may already have been evicted from the caches in response to accesses to other addresses which may trigger replacement in the cache). Therefore, the initial portion prefetched in response to the range prefetch instruction may not cover the entire range between the range start and end addresses.

For addresses within the remaining portion of the specified range, as shown in FIG. 3 the data for prefetch address #A may be prefetched when the prefetch circuitry detects from the addresses 36 of demand accesses that the demand accesses have reached or surpassed a certain address (#A-D), where D is an advance distance parameter which controls the margin by which the prefetch stream leads the demand access stream.

The size J of the initial portion and the distance D are both examples of advance distance parameters which affect the timeliness of prefetches. These parameters may be defined by the prefetch hardware of circuitry 30 independent of any specific software defined parameters specified by the range prefetch instruction. J and D may be fixed or may be dynamically tuneable based on the micro-architectural information 38, which can include information on cache hit/miss rates, demand access frequency, prefetch latency, prefetch success rate or prefetch usefulness for example. It is useful for the advance distance J, D to be controlled in hardware rather than software, because different micro-architectural platforms will experience different latencies when accessing memory, so it can be useful to respond to cues from the micro-architecture to determine how far in advance of the demand access stream the prefetch stream should be issued.

It will be appreciated that FIG. 3 is just one way of controlling prefetching based on the range information defined in the range prefetch instruction and other approaches can also be used.

If the range prefetch instruction specifies multiple ranges, for subsequent ranges of the stride pattern after the first range, the initial portion of size J could be prefetched at various timings: e.g. either directly in response to the range prefetch instruction similar to the first range, or when the demand access stream has reached within a given distance of the end of the previous range. Addresses in the remaining portion of the subsequent range can be prefetched when the demand stream reaches within the distance D of those addresses, similar to that shown for the first range in FIG. 3.

Code Example Demonstrating Ease of Programming

FIGS. 4 and 5 show code examples illustrating the programmability benefits of using the range prefetch instruction instead of software prefetch instructions which each specify a single address. In this example, for ease of explanation, it is assumed that there is no strided pattern, so only a single range is encoded by each instance of the instruction. However, it will be seen that similar benefits can apply to strided ranges.

FIG. 4 shows an example of a program loop modified by a programmer or compiler to include traditional software prefetch instructions PF for prefetching addresses in advance of their expected access timing. Without the prefetch instructions the loop would look as follows:

```
for (i=0; i<N; i++) {
    process(buffer1[i], buffer2[i*2]);
    process(buffer1[i], buffer2[i*2+1]);
}
```

Hence each iteration of the loop performs some arbitrary operation on data from first and second buffers (the processing operation is labelled "process" to indicate that no particular operation is intended and it can be any arbitrary operation). A certain element of the first buffer is to combined with two different elements of the second buffer. Without adding the prefetch operations, the loop is reasonably compact and simple to write.

If single-address-specifying software prefetch instructions are used to control prefetching with this example, then this makes the code much more complicated because the prefetch instructions need to be included a certain distance in advance of the instructions which will actually use the corresponding addresses specified by the prefetch instructions. Therefore, the prefetch instructions "PF" embedded within the processing loop itself have to specify addresses which are a certain distance ADV ahead of the corresponding addresses which will be accessed by the processing instructions themselves. This in turn means that it is not possible to include, within the main program loop, software prefetching instructions for prefetching the data for initial portion of loop iteration with loop count values of i less the ADV. Therefore, as shown in FIG. 4, an additional preliminary loop is added to include the prefetch instructions for priming the caches with the prefetched data to be processed in the initial portion of ADV iterations of the main loop. Also, as the main loop now includes prefetch instructions which prefetch a certain distance in advance of the main demand accesses included in the loop, if this loop is simply executed up to the required number of main data processing loop iterations N, the prefetch instructions will over fetch beyond the end of the data structure being operated on, which could waste cache resource. Hence, in the example of FIG. 4, the main loop may execute over fewer iterations (N-ADV) than the required number of iterations N, and an additional tail loop is added which performs the data processing for a certain number of remaining iterations without any prefetch instructions being included in the tail loop.

Hence, using the single-address-specifying prefetch instructions adds a lot of additional loop control overhead because now instead of having just a single loop there are three loops to process, which introduces overhead because when the high-level code shown in FIG. 4 is compiled into the instruction set supported in hardware, additional branch instructions and comparison instructions will be required to compare the loop counter i against a threshold to decide whether to continue to execute a further iteration of each loop and for controlling program flow according to the comparison. As branches may be subject to misprediction then including these extra loops may harm performance. An alternative could be to eliminate the tail loop and just accept the over-prefetching that would occur if the main loop iterates for the full N iterations, but this may waste memory system bandwidth in doing the unnecessary prefetches and may harm performance as the unnecessarily prefetched data may evict other data which may then cause additional cache misses.

Another problem is that the preferred value of the advance distance ADV may be different for different micro-architectural platforms and vary even on the same micro-architectural platform based on the volume of other patterns of access to memory that may be occurring at the time the code is executed. Therefore, it is very difficult for a software developer or compiler to set that advance distance ADV in a way that is appropriate to a range of micro architectures. This may make code of the type shown in FIG. 4 very platform dependent which greatly increases the software development cost.

In contrast, as shown in FIG. 5 by using the range prefetch instruction the software developer does not need to consider the relative timing of the prefetchers for individual addresses. Instead, the software developer simply includes some range prefetch instructions prior to the original processing loop. Each range prefetch instruction specifies first and second address-range-specifying parameters defining the start and end addresses of a range of addresses corresponding to the data structure to be processed. For example, for the code example shown in FIG. 5, one range prefetch instruction specifies the start address and size of the first buffer, and a second range prefetch instruction specifies the start address and size of the second buffer. This provides useful information to the prefetcher 30 allowing the prefetcher to prefetch in initial portions of the two address ranges corresponding to the first and second buffers, and then the timeliness of subsequent prefetches of data within the address ranges may be controlled in hardware without needing explicit software programming. This avoids the need for the priming and tail loops as shown in FIG. 4 and also greatly reduces the number of prefetch instructions to be inserted, saving instruction fetch and decode bandwidth.

Strided Range Encoding

FIG. 6 shows a more detailed example of an instruction encoding of the range prefetch instruction. The instruction encoding includes:

a first register identifier field Rn specifying a register which provides the range start address 50, a second register identifier field Rm which specifies a register providing the range size parameter 52 (indicated as "length" in FIG. 6), stride parameter 56 and count parameter 58; and a prefetch operation field Rp which provides the additional prefetch hints 54 as described earlier. The prefetch operation field Rp could be interpreted either as a register identifier field identifying a register providing the prefetch hints, or as an immediate value identifying the prefetch hints.

The remaining bits of the instruction encoding other than fields Rn, Rm, Rp either provide opcode bits which identify that this instruction is a range prefetch instruction, could be used to signal different variants of range prefetch instructions, or could be reused for other purposes.

An encoding of the register data stored in the register identified in the Rn field of the instruction is shown in the lower part of FIG. 6. The range size (length), stride and count parameters 52, 56, 58 are all encoded in the same register. In this example, the length and stride parameters are specified using 22 bits each and the count is specified using 16 bits which means that all three values can fit within a single 64-bit register which can be identified using a Rm field. Of course, other sizes of the length, stride and count parameters are also possible. Also, in this example the length and stride values are signed values which could be either positive or negative. It would also be possible to define the length and stride as unsigned values which are always positive. The range size and stride value are encoded as an arbitrary software-specified number of bytes, which is not limited to being an exact power of 2 number of bytes.

Figure 7:
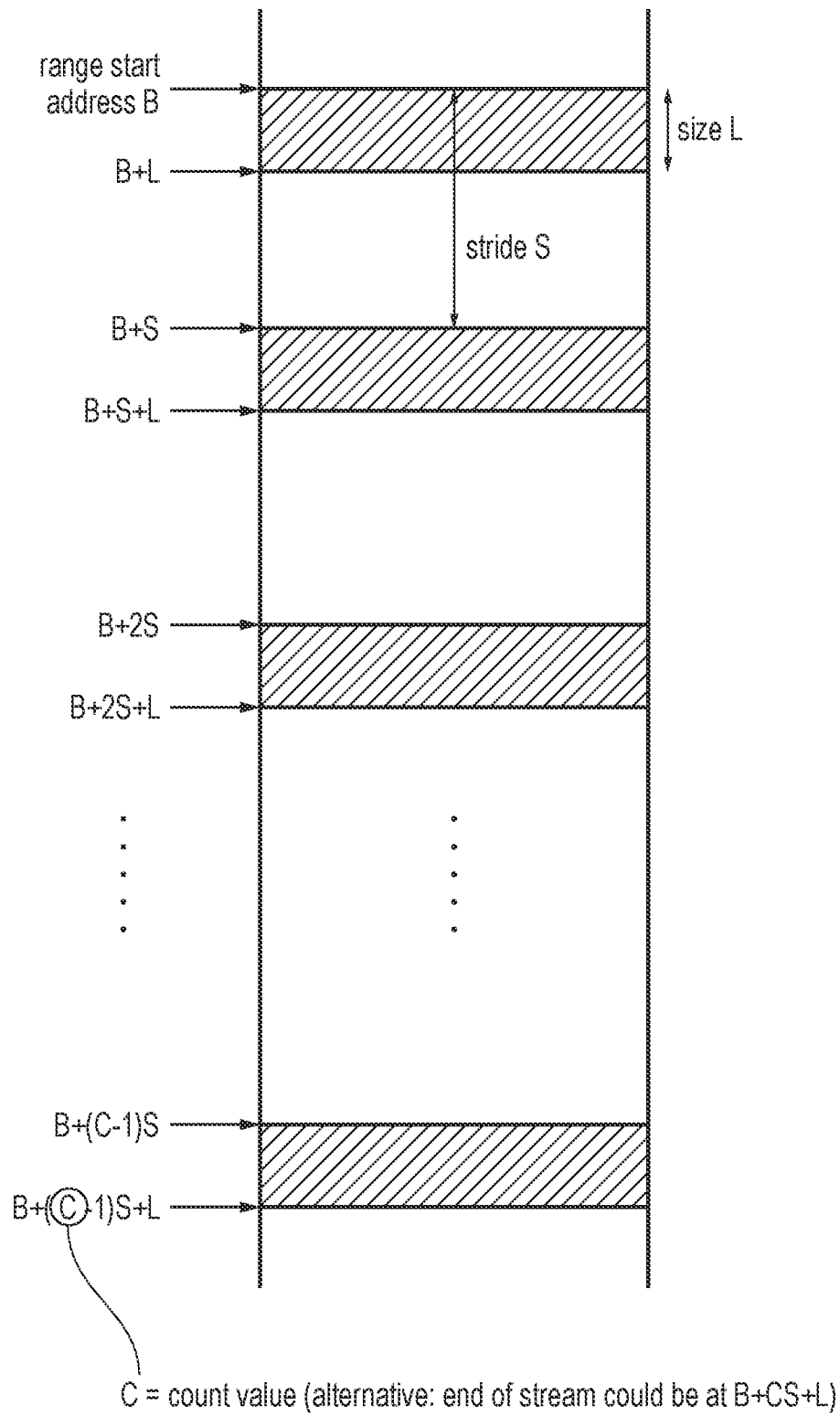
FIG. 7 illustrates use of the stride and count parameters to control prefetching of multiple ranges of addresses at intervals of the specified stride.

FIG. 7 schematically illustrates the use of the first and second address-range-specifying parameters 50, 52, stride parameter 56 and count parameter 58 for controlling prefetching of data from multiple address ranges separated at intervals of the specified stride. The range start address 50 (indicates as B to indicate a base address) identifies the address at the start of the first of the group of ranges represented by the range prefetch instruction. The range size parameter 52 (or length, L) indicates the size of each of the group of ranges. Hence the end address of the first range in the group is at an address B+L. The stride parameter S indicates the offset between start addresses of successive ranges in the group, and so the second range in the group extends from addresses B+S to B+S+L, the third range in the group extends from address B+2S to B+2S+L, and so on. The count value C indicates the total number of ranges for which prefetching is to be controlled based on the range prefetching instruction, so that the final range in the group may extend from address B+(C−1)S to B+(C−1)S+L.

Alternatively, if it is considered implicit that the range prefetch circuitry always instructs at least one range to be subject to prefetch control (so that a count value of 0 may not be useful), then the count C could be defined so that it indicates the total number of ranges minus 1, and so in this case the end of the stream could be at address B+CS+L so that the total number of ranges is then C+1, accounting for the fact that the very first range does not need an explicit encoding and so this can allow a greater maximum number of ranges to be encoded in a certain number of bits.

However, it may be more intuitive for use by software developers if the count field 58 encodes the total number of ranges C including the first range in the group (the C=0 encoding could be reused to encode other information such as an additional prefetch hint for example).

FIG. 8 illustrates a use case where this strided group of address ranges can be useful for controlling prefetching.

Machine learning algorithms (such as convolutional neural networks) may involve convolution operations where a relatively small kernel matrix of weights is convolved with a larger matrix of input activations, where an output matrix generated in the convolution operation depends on various combinations of multiplying kernel weights with input activations for different combinations of kernel/activation positions, where logically the kernel is effectively swept across different positions of the input matrix and the multiplications performed in the convolution operation represent products of correspondingly positioned kernel weights and activations when the kernel is at a given position relative to the matrix.

Such convolutions may require many load/store operations to memory to load in various sets of activations for different kernel positions and store back processing results. The data loaded for a given kernel position may correspond to a number of relatively small portions of rows or columns (e.g. the portions represented by the shaded part of the matrix in the top portion of FIG. 8), so that they may follow a pattern of accesses such as the one shown in FIG. 7 where there are a number of ranges of interest separated at intervals in a constant stride. It will be appreciated that this is a simplification of the convolution operation for the ease of explanation and in practice the layout of the activation data in memory may not match the logical arrangement of the matrix as shown in FIG. 8 (e.g. where there are multiple layers of activations the elements associated with a given column or row of a given layer may not actually be contiguous in memory). Nevertheless, it is common in such convolution operations that there are accesses to a number of ranges which are discontiguous in memory but are of equal size and with a regular offset between the start of one range and the start of the next.

Hence, by providing a range prefetch instruction which supports specifying a stride parameter as shown in FIGS. 6 and 7, this allows a single instruction to prime prefetch circuitry 30 to control accurate prefetching of a number of ranges of addresses discontiguously located in the address space, with much less training overhead than if a pure hardware prefetching technique was used, while being much easier to program than options which use software prefetch instructions specifying a single address each.

Example Micro-Architectural Options for the Prefetch Circuitry 30

Figure 9:
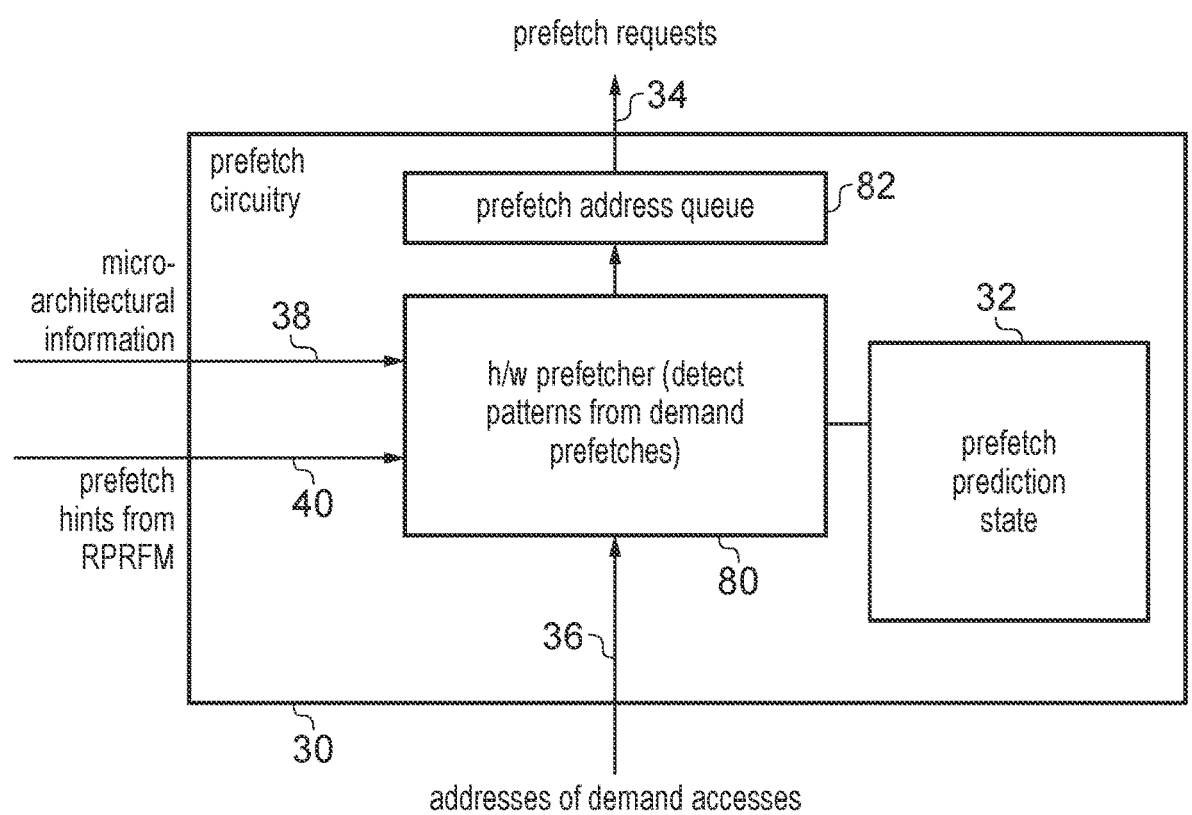
FIGS. 9, 10 and 11 illustrate different examples for micro-architectural implementation of prefetch circuitry.
Figure 10:
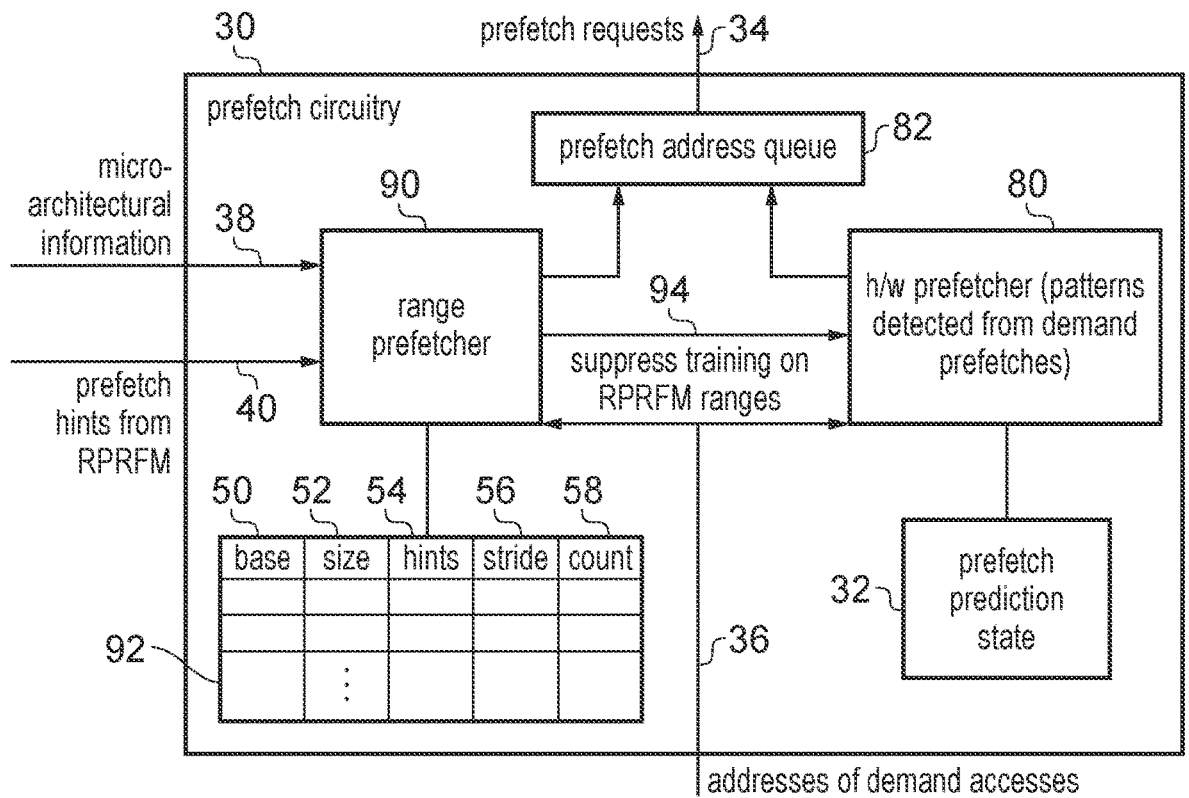
Figure 11:
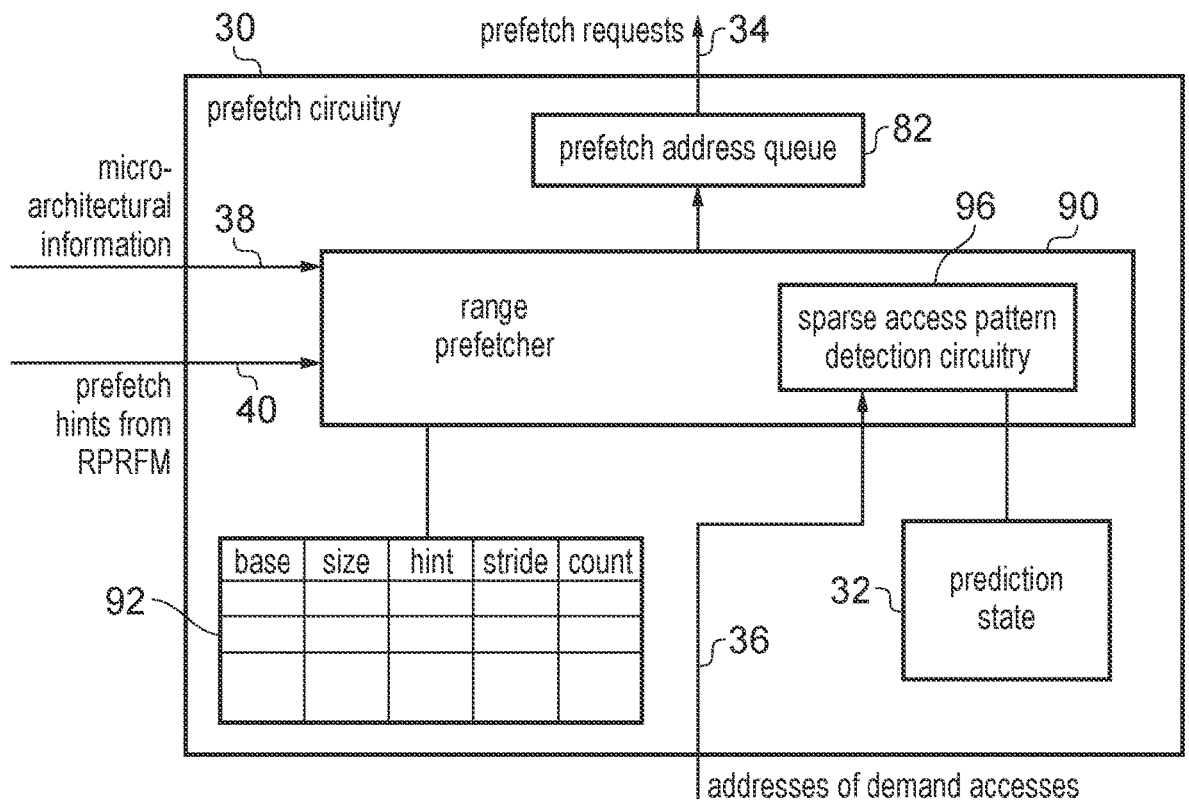

FIGS. 9 to 11 show various examples of possible micro-architectural implementations for the prefetch circuitry 30.

FIG. 9 shows a first example where the prefetch circuitry comprises a hardware prefetcher 80, which can prefetch data for addresses predicted according to addresses 36 of demand accesses, with the prefetch training according to any known scheme. For example, this can be based on stride detection (with single strides or multiple different strides) within the demand address stream.

Compared to typical hardware prefetchers, hardware prefetcher 80 is modified to supplement its training with use of additional prefetch hints from the range prefetch instruction, without requiring a dedicated prefetching state machine separate from the existing state machines implemented for training of prediction state 32 based on monitoring of address 36 of demand accesses. A typical hardware prefetcher may already have control logic which can monitor the addresses 36 of the demand accesses, detect patterns such as stride sequences, and gradually adapt confidence in the observed sequences so that once confidence reaches a certain level then the hardware prefetcher 80 may begin to issue prefetch addresses to a prefetch address queue 82 according to the patterns detected in the demand address stream 36, so that the prefetch request 34 can then be issued to the memory system to prefetch data from the indicated prefetch addresses in the queue 82.

When the range prefetch instruction is supported then the range boundaries and stride from the range prefetch instruction prime the prediction state 32 to more quickly settle on a confidently predicted stream of prefetch addresses. For example, the start address (or the sum of the start address 50 and a multiple of the stride parameter 56) from the range prefetch instruction can be used to initialise a new entry of the prefetch prediction state 32 to immediately recognise that a stream of predictable addresses will follow that start address, whereas with standard hardware prefetching techniques it may take some time for the hardware prefetcher to detect from the demand address stream 36 that the demand accesses have reached that region of the address space and settle on a confident prediction.

Another approach could be that when a range prefetch instruction is encountered which identifies that prefetching is to be performed for a given range of addresses, then the confidence of a corresponding entry in the prefetch prediction state 32 could be boosted so it indicates greater confidence than would ordinarily be set if the same demand address stream 36 had been encountered without executing the range prefetch instruction.

Similarly, the end address of a range identified by the range prefetch instruction can be programmed into an entry of the prefetch prediction state 32, so that the hardware prefetcher 80 can stop generating prefetch requests once the prefetch stream has gone beyond the end address or it has been observed that the demand address stream 36 has moved beyond the end address of the specified range.

FIG. 10 shows a second example in which, in addition to the hardware prefetcher 80 which may operate according to conventional hardware prefetching techniques based on the monitoring of the demand address stream 36, the prefetch circuitry 30 also includes a range prefetcher 90 which runs a separate state machine to respond to the prefetch hints 40 received from the range prefetch instruction. With this approach the range prefetcher 90 may act in parallel with the hardware prefetcher 80 and both hardware prefetcher 80 and range prefetcher 90 may provide prefetch addresses to the prefetch address queue 82 to trigger corresponding prefetch requests 34 to be issued to the memory system.

The range prefetcher 90 could maintain a set of prediction state 92 separate from the prefetch prediction state 32 maintained by the hardware prefetcher, but the range prefetch prediction state 92 could be simpler. For example, range prefetch prediction state 92 could simply record the parameters 50, 52, 54, 56, 58 of the range prefetch instruction, but it may not be needed to include other fields included in prefetch prediction state 32 such as confidence fields or fields recording multiple possible candidates for a detected pattern of accesses. Other examples could encode the prediction state 92 in another way—e.g. the multiple ranges encoded using the stride parameter of the range prefetch instruction could be assigned separate entries of prediction state.

With the approach shown in FIG. 10, when a range prefetch instruction is decoded by the instruction decoder 4, the range prefetcher could control prefetching in the way shown in FIG. 3, where for the first specified range of a set of one or more ranges encoded by the range prefetch instruction, an initial portion of size J is prefetched initially as a response to installation of a new entry in the range prefetch state table 92, and then subsequent prefetching is controlled at timings which mean that prefetching remains a certain distance D ahead of the observed pattern of demand addresses 36. The micro-architectural information 38 can be used to set the size of the initial portion J and the advance distance D as discussed earlier.

The range prefetcher 90 in this example may also provide a signal 94 to the hardware prefetcher 80 to suppress the hardware prefetcher 80 from performing training of prefetches in the ranges where the range prefetcher 90 is performing the prefetching. If a non-prefetch hint described in FIG. 2 is supported then this signal could also be used to suppress prefetching in the ranges indicated by a reach range prefetch instruction as not needing to be prefetched at all.

Hence, by providing the range prefetcher 90 which can perform more accurate prediction with a lower volume of prediction state information than the hardware prefetcher 80, due to exploiting the hints available from the range prefetch instruction, and suppressing training by the hardware prefetcher 80 in those ranges, this preserves the resource in the hardware prefetcher 80 for detecting other patterns of addresses which have not explicitly been indicated as being useful to prefetch by a software prefetch instruction. This means that for a given size of circuit area of the prefetch circuitry 30, overall performance can be improved since there is more training resource available for other addresses outside the ranges handled by the range prefetcher 90, or alternatively, for a given amount of prefetch coverage, the size of the hardware prefetcher 80 and prediction state storage 32 can be reduced while maintaining an equivalent level of performance. Hence this approach can provide a better balance between performance and circuit area and power costs.

FIG. 11 shows another possible micro-architectural implementation in which, in this example the range prefetcher 90 is provided within the prefetch circuitry 30 but there is no dedicated hardware prefetcher 80 for detecting access patterns outside the ranges indicated by the range prefetch instruction hints 40. In this case prefetching may not be performed at all outside those ranges. This approach can be much less costly in terms of circuit area. The range prefetcher 90 in this example may operate similar to that described in FIG. 10.

Optionally, as shown in FIG. 11 the range prefetcher 90 could include sparse access pattern detection circuitry 96 to perform further hardware-controlled training of prediction of sparse patterns of access within the ranges being handled by the range prefetcher 90. This can help to handle cases where although the software has indicated an overall range(s) within which address accesses are likely, not every address will necessarily be accessed and so prefetching data from each address within the range could lead to over-prefetching affecting performance if this causes replacement of other data in caches. The sparse access pattern detection circuitry 96 may function in the same way as the hardware prefetcher 80 shown in the earlier examples, in that it monitors demand address sequences 36 to maintain prediction state 32 which may express information about the type of access pattern detected and an associated level of confidence, to allow prefetch requests to be generated for predicted addresses predicted based on the detected sparse access patterns. However, in comparison to the hardware prefetcher 80 shown in FIG. 9 or FIG. 10, the sparse access pattern detection circuitry 96 and corresponding prediction state 32 may be much less costly in terms of circuit area and power consumption because the training performed by the sparse access pattern detection circuitry 96 is only applied to the addresses within the ranges being handled by the range prefetcher 90, rather than to the entire address space, and so much less prediction state data will be generated and need to be compared.

Where additional prefetch hints 54 are available from a range of prefetch instructions then this may influence the sparse access pattern detection. For example, the dense/sparse indicator may be used to determine whether to invoke the sparse access pattern detection circuitry 96 at all for a given range tracked in the range tracking data 92. If the corresponding range prefetch instruction has indicated that the pattern will be a dense access pattern then the power cost of training the sparse access pattern detection circuitry 96 can be avoided by suppressing use of the sparse access pattern detection circuitry for that range and also this will preserve the limited prediction state storage 32 for training on other ranges. On the other hand, when the dense/sparse indicator specifies a sparse access pattern then training may be activated using the sparse access pattern detection 96, and if a sparse access pattern type is specified in the prefetch hints 54 then this may help the sparse access pattern detection circuitry 96 settle on a confident prediction more quickly or decide which specific form of pattern detection to apply to a given range of addresses.

It will be appreciated that the same code could execute across any of the micro-architectural implementations of the prefetcher shown in FIGS. 9 to 11 and that there may be many other ways in which the range information 50, 52 and additional prefetch hints 54 can be used by prefetchers to improve their predictions.

While not shown in any of FIGS. 9 to 11, some examples of the prefetch circuitry may also include some address translation circuitry similar to the MMU 22 of the processing circuitry 6 shown in FIG. 1. Like the MMU 22, the address translation circuitry of the prefetch circuitry could include a relatively small TLB 24. By providing some translation logic in the prefetch circuitry 30, this allows addresses to be translated for the purpose of prefetching without consuming bandwidth for translation of demand addresses, which may be more critical to performance. Which addresses are translated by the address translation circuitry of the prefetch circuitry 30 may depend on whether prefetching is trained based on virtual or physical addresses. If training is based on virtual addresses, the translation could be of the prefetch addresses specified for prefetch requests issued to the memory system. If training is based on physical addresses, the translation could be of the addresses of ranges specified based on the operands of a range prefetch instruction.

Alternatively, in other examples any address translations required for prefetching can be handled by the main MMU 22 associated with the processing circuitry 6, which also handles translations for demand accesses.

Example Methods

Figure 12:
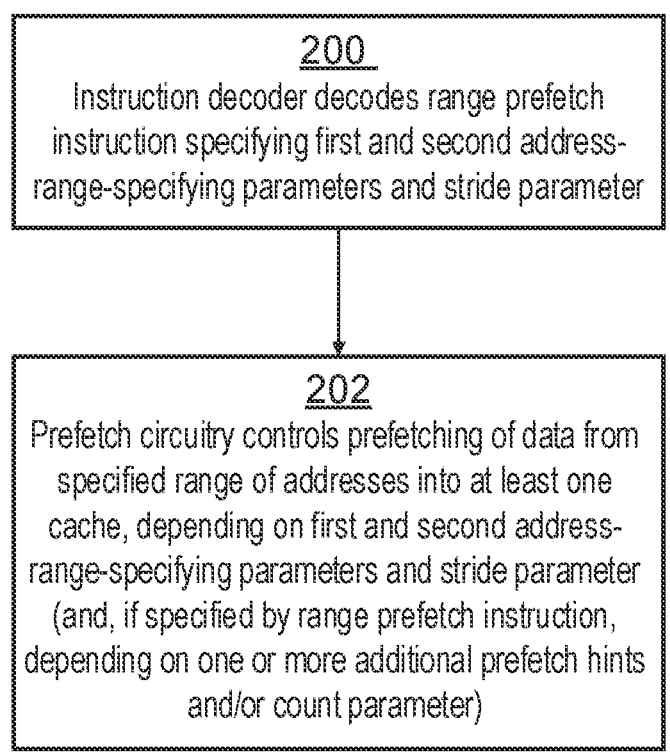
FIG. 12 is a flow diagram illustrating control of prefetching based on the range prefetch instruction.

FIG. 12 is a flow diagram illustrating a method of performing prefetching. At step 200 the instruction decoder 4 decodes a range prefetch instruction specifying first and second address-range-specifying parameters 50, 52 and a stride parameter 56. At step 202, in response to decoding of the range prefetch instruction, the prefetch circuitry 30 controls prefetching of data from one or more specified ranges of addresses into at least one cache 14, 16, 18, depending on the first and second address-range-specifying parameters and the stride (and, if specified by the range prefetch instruction, also depending on one or more additional prefetch hints). Some examples may also encode a count parameter to control the prefetching.

Figure 13:
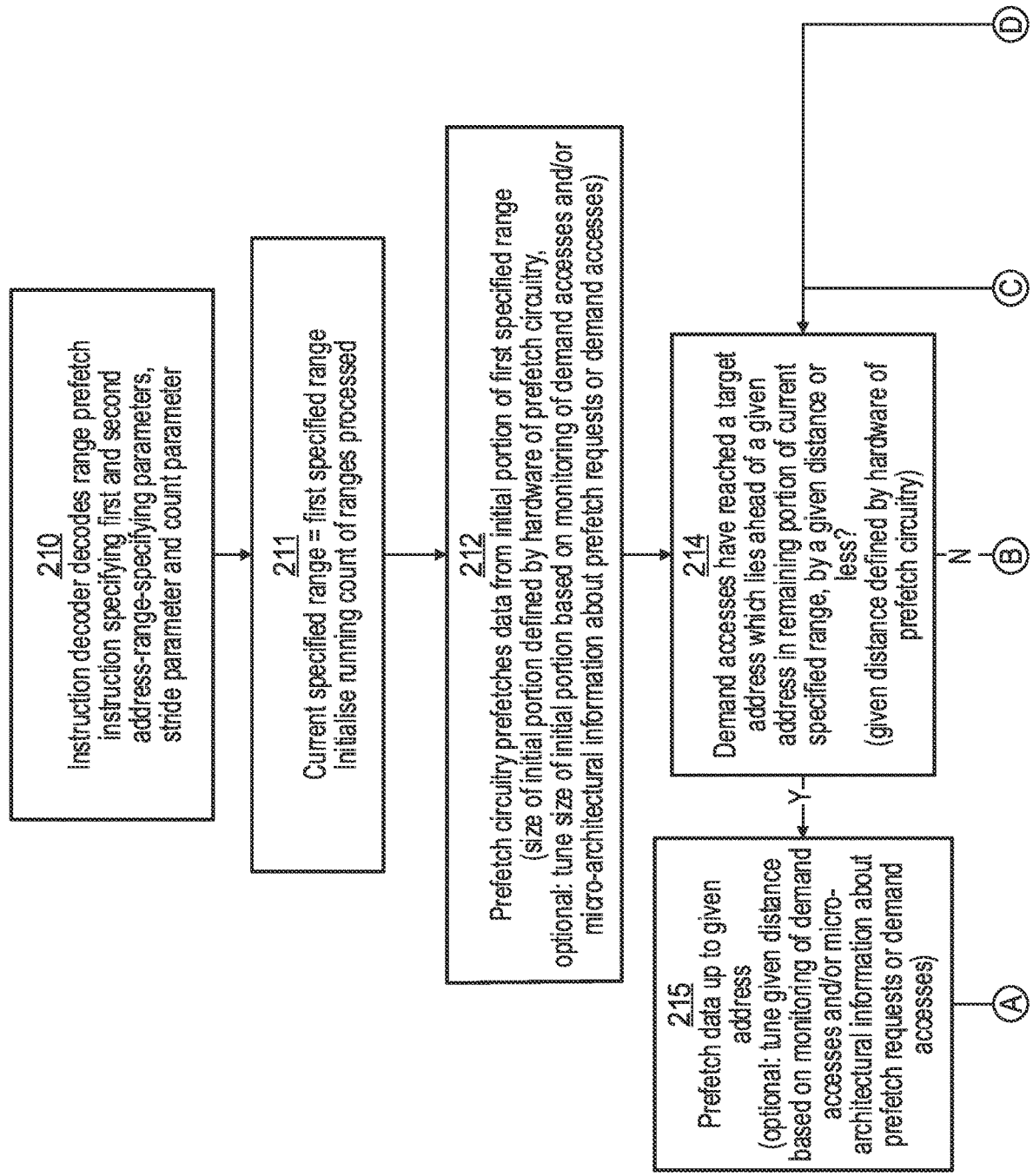
FIG. 13 illustrates a flow diagram showing in more detail control of prefetching based on the first and second address-range-specifying parameters.
Figure 13:
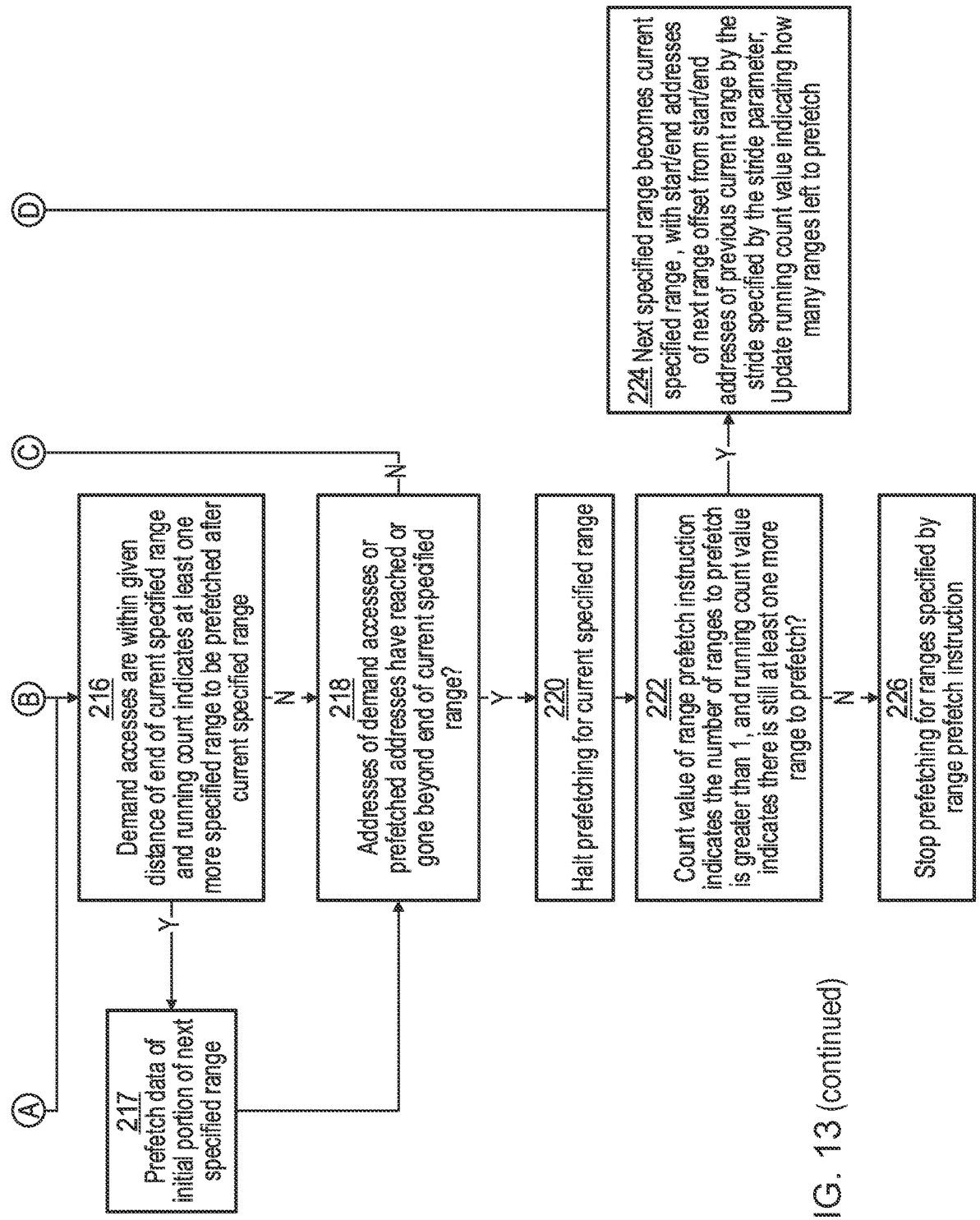

FIG. 13 is a second flow diagram illustrating in more detail a method of controlling prefetching based on the range prefetch instruction. At step 210 the instruction decoder 4 decodes a range prefetch instruction specifying the first and second address-range-specifying parameters 50, 52, the stride parameter 56 and the count parameter 58 (and optionally the prefetch hints 54). At step 211, the prefetch circuitry 30 initialises a running count of how many ranges specified by the range prefetch instruction have already been processed and the first of the specified ranges is treated as a current specified range to be processed.

As a response to the range prefetch instruction, at step 212 the prefetch circuitry 30 prefetches data from an initial portion of the first specified range of addresses. The size of the initial portion is defined by the hardware of the prefetch circuitry 30 and can be independent of information specified in the range prefetch instruction. Optionally, the size of the initial portion can be tuned based on the monitoring of the demand accesses and/or on the micro-architectural information 38 about the outcomes of prefetch requests or demand accesses, although some examples could also use hints provided by software on the size of the initial portion, or information specifying a link with a previous range to help with prefetching initial portion of the range, to decide the size of the initial portion (nevertheless, even if software-provided hints are available, the hardware still has flexibility to deviate from the size of the initial portion indicated by software if the micro-architectural cues indicate that a different sized initial portion is estimated to be better for performance). Micro-architectural cues, such as a rate of cache misses, fraction of prefetch requests which are considered successful because there is a subsequent demand access hitting on the same address, or information about latency of processing the prefetch request or demand access request, can be useful to decide how much in advance of the demand access stream to issue the prefetch request to corresponding addresses, and so if a greater advance distance is desired then it may be useful to increase the size of the initial portion prefetched at step 212.

Having prefetched the initial portion, the prefetch circuitry 30 monitors the addresses 36 of the demand accesses. At step 214 it is detected that the demand accesses have reached a target address which lies ahead of a given address in the remaining portion of the current specified range by a given distance or less. Again, the given distance is defined by the hardware of the prefetch circuitry. When demand accesses have reached the target address, then at step 215 prefetching of data up to the given address is performed. Again, the given distance can be tuned based on monitoring of demand accesses and/or micro-architectural information about outcomes of prefetch requests or demand access requests.

At step 216, the prefetch circuitry 30 detects whether demand accesses are within a given distance of the end of the current specified range, and the running count value maintained by the prefetch circuitry 30 to track how many ranges are still to be processed indicates that there is at least one more specified range to be prefetched after the current range. The given distance at step 216 can be the same as the given distance at step 214, or could be different. If the demand access addresses are within a given distance of the end of the current range and there is at least one more range to be prefetched, then at step 217 the prefetch circuitry 30 issues prefetch requests for addresses in an initial portion of the next specified range after the current specified range in the strided group of ranges. Step 217 is omitted if demand accesses are not yet within a given distance of the end of the current specified range or the running count indicates this is the final range to be prefetched.

At step 218, the prefetch circuitry 30 also checks whether the addresses 36 of the demand accesses or the addresses of issued prefetch requests have reached or gone beyond the end of the current specified range. If neither the demand address stream nor the prefetch address stream has yet reached the end of the specified range then the method continues to loop through steps 214, 216, 218 until either the demand accesses or the prefetch accesses have gone beyond the end of the specified range.

Once the end of the specified range has been reached then at step 220 prefetching is halted for the specified range.

At step 222 the prefetch circuitry 30 checks whether the running count value (maintained internally in the prefetch circuitry 30 to track how many of the discontiguous ranges in the strided set have already been processed) indicates that there is still at least one more of the group of discontiguous ranges still to be processed. If there is at least one more range to prefetch then at step 224 the next specified range becomes the current specified range. Hence, the start/end addresses of the next range are addresses offset by the stride parameter relative to the start/end addresses of the range previously acting as the current range. The running count value used to track how many ranges are left to process is updated to indicate how many ranges are still left to be prefetched and then the method returns to step 214 to continue monitoring demand accesses to determine when to issue prefetch requests for the next range.

Hence, where the stride and count parameter are used to define multiple ranges then each range is processed in the corresponding way by a pass through steps 214 to 224 and then eventually when at step 222 it is determined that there are no more ranges to prefetch then at step 226 prefetching is stopped for the ranges represented by the range prefetch instruction.

While FIG. 13 shows certain steps being performed sequentially in a certain order, it will be appreciated that other implementations may reorder steps and perform some steps in parallel. For example, the checks at steps 214, 216, 218 could be implemented in parallel or in a different order.

Also, it will be appreciated that the approach shown in FIG. 13 is just one example, and other implementations could use the prefetch instruction parameters provided by the range prefetch instruction in a different way.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an instruction decoder to decode instructions;
processing circuitry to perform data processing in response to decoding of the instructions by the instruction decoder;
at least one cache to cache data for access by the processing circuitry; and
prefetch circuitry to prefetch data into the at least one cache, wherein:
in response to the instruction decoder decoding a range prefetch instruction specifying first and second address-range-specifying parameters and a stride parameter, the prefetch circuitry is configured to obtain the first and second address-range-specifying parameters and the stride parameter, where a start address and size of each specified range is dependent on the first and second address-range-specifying parameters, and the stride parameter specifies an offset between start addresses of successive specified ranges of the plurality of specified ranges, and
based on the first and second address-range-specifying parameters and the stride parameter, the prefetch circuitry is configured to determine whether to prefetch specified data from addresses within a plurality of specified ranges of addresses into the at least one cache.

2. The apparatus according to claim 1, in which the first address-range-specifying parameter comprises a base address of a selected one of the plurality of specified ranges, and the second address-range-specifying parameter comprises a range size parameter specifying a size of each of the plurality of specified ranges.

3. The apparatus according to claim 1, in which the range prefetch instruction also specifies a count parameter indicating a number of ranges in said plurality of specified ranges.

4. The apparatus according to claim 1, in which the stride parameter is encoded in a same register as one of the first and second address-range-specifying parameters.

5. The apparatus according to claim 1, in which, in response to the instruction decoder decoding the range prefetch instruction, the prefetch circuitry is configured to control prefetching of data from the plurality of specified ranges of addresses into the at least one cache, depending on both:
the first and second address-range-specifying parameters and the stride parameter; and
at least one of:
monitoring of addresses or loaded data associated with demand access requests issued by the processing circuitry to request access to data; and
micro-architectural information associated with an outcome of prefetch requests or the demand access requests.

6. The apparatus according to claim 5, in which the micro-architectural information comprises at least one of: prefetch line fill latency, demand access frequency, demand access hit/miss information, demand access prefetch hit information, and prefetch usefulness information.

7. An apparatus comprising:
an instruction decoder to decode instructions;
processing circuitry to perform data processing in response to decoding of the instructions by the instruction decoder;
at least one cache to cache data for access by the processing circuitry; and
prefetch circuitry to prefetch data into the at least one cache; in which:
in response to the instruction decoder decoding a range prefetch instruction specifying first and second address-range-specifying parameters and a stride parameter, the prefetch circuitry is configured to control, depending on the first and second address-range-specifying parameters and the stride parameter, prefetching of data from a plurality of specified ranges of addresses into the at least one cache, where a start address and size of each specified range is dependent on the first and second address-range-specifying parameters, and the stride parameter specifies an offset between start addresses of successive specified ranges of the plurality of specified ranges,
in which the prefetch circuitry is configured to control, based on monitoring of addresses or loaded data associated with demand access requests issued by the processing circuitry to request access to data or micro-architectural information associated with an outcome of prefetch requests or the demand access requests, a timing at which a prefetch request is issued for a given address within the plurality of specified ranges.

8. The apparatus according to claim 1, in which the prefetch circuitry comprises sparse access pattern detecting circuitry to detect, based on monitoring of the addresses of demand access requests, a sparse pattern of accessed addresses within a given specified range of the plurality of specified ranges, and to select which specific addresses within the given specified range are to be prefetched based on the detected sparse pattern.

9. An apparatus comprising:
an instruction decoder to decode instructions;
processing circuitry to perform data processing in response to decoding of the instructions by the instruction decoder;
at least one cache to cache data for access by the processing circuitry; and
prefetch circuitry to prefetch data into the at least one cache; in which:
in response to the instruction decoder decoding a range prefetch instruction specifying first and second address-range-specifying parameters and a stride parameter, the prefetch circuitry is configured to control, depending on the first and second address-range-specifying parameters and the stride parameter, prefetching of data from a plurality of specified ranges of addresses into the at least one cache, where a start address and size of each specified range is dependent on the first and second address-range-specifying parameters, and the stride parameter specifies an offset between start addresses of successive specified ranges of the plurality of specified ranges,
in which the prefetch circuitry is configured to control timing of issuing of prefetch requests based on an advance distance defined by the prefetch circuitry, the advance distance indicative of how far ahead a stream of prefetch addresses of the prefetch requests is in comparison to a stream of demand addresses of demand access requests issued by the processing circuitry to request access to data.

10. The apparatus according to claim 9, in which the prefetch circuitry is configured to define the advance distance, independent of any explicit specification of the advance distance by the range prefetch instruction.

11. The apparatus according to claim 9, in which the prefetch circuitry is configured to tune the advance distance based on micro-architectural information associated with an outcome of the prefetch requests or the demand access requests.

12. The apparatus according to claim 1, in which, in response to the instruction decoder decoding the range prefetch instruction, the prefetch circuitry is configured to trigger prefetching of data from an initial portion of a first specified range of the plurality of specified ranges into the at least one cache.

13. The apparatus according to claim 12, in which the prefetch circuitry is configured to define a size of the initial portion, independent of any explicit specification of the size of the initial portion by the range prefetch instruction.

14. The apparatus according to claim 12, in which the prefetch circuitry is configured to trigger prefetching of data from a given address within a remaining portion of the first specified range, in response to detecting the processing circuitry issuing a demand access request specifying a target address which is ahead of the given address by a given distance or less.

15. The apparatus according to claim 14, in which the prefetch circuitry is configured to define the given distance, independent of any explicit specification of the given distance by the range prefetch instruction.

16. The apparatus according to claim 1, in which, following decoding of the range prefetch instruction, the prefetch circuitry is configured to halt prefetching for a given specified range of the plurality of specified ranges when the prefetch circuitry identifies that an end of the given specified range has been reached by a stream of prefetch addresses prefetched by the prefetch circuitry or a stream of demand addresses specified by demand access requests issued by the processing circuitry.

17. The apparatus according to claim 1, in which the range prefetch instruction also specifies one or more prefetch hint parameters for providing a hint about data associated with the plurality of specified ranges, and the prefetch circuitry is configured to control, depending on the one or more prefetch hint parameters, prefetching of data from the plurality of specified ranges into the at least one cache.

18. The apparatus according to claim 17, in which the one or more prefetch hint parameters includes at least one of:
- a type parameter indicative of whether prefetched data is data expected to be subject to a load operation, data expected to be subject to a store operation or instructions to expected to be subject to an instruction fetch operation;
- a data usage timing parameter indicative of at least one of: an indication of how soon the prefetched data is estimated to be requested by the processing circuitry after the range prefetch instruction, and a target level of a cache hierarchy into which the data is to be prefetched;
- a data reuse timing parameter indicative of at least one of: an indication of an estimated interval between a first demand access to the prefetched data and a further demand access to the prefetched data, or a selected level of the cache hierarchy to which the prefetched data is preferred to be evicted if replaced from a given level of the cache hierarchy;
- an access pattern hint indicative of relative denseness/sparseness of a pattern of accesses to addresses within the plurality of specified ranges, or of a sparse access pattern type;
- a reuse likelihood parameter indicative of a likelihood of whether the prefetched data is expected to be used once or to be used multiple times; and
- a non-prefetch hint parameter indicative that prefetching of data from the plurality of specified ranges should be suppressed.

19. The apparatus according to claim 17, in which the prefetch circuitry is configured to set, depending on the one or more prefetch hint parameters, cache replacement hint information or cache replacement policy information associated with data prefetched from the plurality of specified ranges specified by the range prefetch instruction; and
the cache is configured to control replacement of cache entries based on the cache replacement hint information or cache replacement policy information set by the prefetch circuitry.

* * * * *